US012645182B2

(12) United States Patent (10) Patent No.: US 12,645,182 B2
Callens et al. (45) Date of Patent: Jun. 2, 2026

(54) METHODS AND SYSTEMS FOR MINIMIZING HAZE DURING HOLOGRAPHIC RECORDING

(71) Applicant: DigiLens Inc., Sunnyvale, CA (US)

(72) Inventors: Michiel Koen Callens, Sunnyvale, CA (US); Milan Momcilo Popovich, Leicester (GB); Alastair John Grant, San Jose, CA (US)

(73) Assignee: DigiLens Inc., Sunnyvale, CA (US)

( * ) Notice: Subject to any disclaimer, the term of this patent is extended or adjusted under 35 U.S.C. 154(b) by 994 days.

(21) Appl. No.: 17/649,272

(22) Filed: Jan. 28, 2022

(65) Prior Publication Data

US 2022/0244680 A1 Aug. 4, 2022

Related U.S. Application Data

(60) Provisional application No. 63/143,485, filed on Jan. 29, 2021.

(51) Int. Cl.
 *G03H 1/04* (2006.01)
(52) U.S. Cl.
 CPC ......... *G03H 1/0402* (2013.01); *G03H 1/0465* (2013.01); *G03H 2001/0441* (2013.01);
 (Continued)
(58) Field of Classification Search
 USPC ........................................................... 359/3
 See application file for complete search history.

(56) References Cited

U.S. PATENT DOCUMENTS

| 1,043,938 A | 11/1912 | Huttenlocher |
| 3,482,498 A | 12/1969 | Becker |
(Continued)

FOREIGN PATENT DOCUMENTS

| BR | PI0720469 A2 | 1/2014 |
| CA | 2889727 A1 | 6/2014 |
(Continued)

OTHER PUBLICATIONS

Mach et al., "Switchable Bragg diffraction from liquid crystal in colloid-templated structures", Europhysics Letters, Jun. 1, 2002, vol. 58, No. 5, pp. 679-685.
(Continued)

*Primary Examiner* — Jyotsna V Dabbi
(74) *Attorney, Agent, or Firm* — Bodman PLC

(57) ABSTRACT

Methods and systems for forming holographic gratings are described herein. The methods and systems may decrease the amount of haze produced during exposure of a holographic recording medium. In some embodiments, the methods and systems include a holographic recording medium; a master hologram containing a grating; and a light source and moveable deflector configured to diffract light through the master hologram into the holographic medium to form a holographic interference pattern. The moveable deflector is configured to move in a direction parallel to the extending direction of the grating. Advantageously, moving the light in this direction allows the holographic interference pattern to remain stationary while there is a spatio-temporal displacement and cancellation of unwanted intensity nonuniformities.

7 Claims, 16 Drawing Sheets
(8 of 16 Drawing Sheet(s) Filed in Color)

(52) U.S. Cl.
CPC ..... *G03H 2222/36* (2013.01); *G03H 2223/23* (2013.01); *G03H 2223/24* (2013.01)

(56) References Cited

U.S. PATENT DOCUMENTS

| | | | |
|---|---|---|---|
| 3,741,716 A | 6/1973 | Johne et al. | |
| 3,843,231 A | 10/1974 | Borel et al. | |
| 3,965,029 A | 6/1976 | Arora | |
| 3,975,711 A | 8/1976 | McMahon | |
| 4,035,068 A | 7/1977 | Rawson | |
| 4,066,334 A | 1/1978 | Fray et al. | |
| 4,248,093 A | 2/1981 | Andersson et al. | |
| 4,251,137 A | 2/1981 | Knop et al. | |
| 4,322,163 A | 3/1982 | Schiller | |
| 4,386,361 A | 5/1983 | Simmonds | |
| 4,389,612 A | 6/1983 | Simmonds et al. | |
| 4,395,088 A * | 7/1983 | Firth | G02B 5/32 |
| | | | 359/900 |
| 4,403,189 A | 9/1983 | Simmonds | |
| 4,418,993 A | 12/1983 | Lipton | |
| 4,472,037 A | 9/1984 | Lipton | |
| 4,523,226 A | 6/1985 | Lipton et al. | |
| 4,544,267 A | 10/1985 | Schiller | |
| 4,562,463 A | 12/1985 | Lipton | |
| 4,566,758 A | 1/1986 | Bos et al. | |
| 4,583,117 A | 4/1986 | Lipton et al. | |
| 4,643,515 A | 2/1987 | Upatnieks | |
| 4,688,900 A | 8/1987 | Doane et al. | |
| 4,711,512 A | 12/1987 | Upatnieks | |
| 4,728,547 A | 3/1988 | Vaz et al. | |
| 4,729,640 A | 3/1988 | Sakata et al. | |
| 4,765,703 A | 8/1988 | Suzuki et al. | |
| 4,791,788 A | 12/1988 | Simmonds et al. | |
| 4,792,850 A | 12/1988 | Lipton et al. | |
| 4,811,414 A | 3/1989 | Fishbine et al. | |
| 4,848,093 A | 7/1989 | Simmonds et al. | |
| 4,884,876 A | 12/1989 | Lipton et al. | |
| 4,890,902 A | 1/1990 | Doane et al. | |
| 4,933,976 A | 6/1990 | Fishbine et al. | |
| 4,938,568 A | 7/1990 | Margerum et al. | |
| 4,960,311 A | 10/1990 | Moss et al. | |
| 4,964,701 A | 10/1990 | Dorschner et al. | |
| 4,967,268 A | 10/1990 | Lipton et al. | |
| 4,970,129 A | 11/1990 | Ingwall et al. | |
| 4,971,719 A | 11/1990 | Vaz et al. | |
| 4,994,204 A | 2/1991 | Doane et al. | |
| 5,004,323 A | 4/1991 | West | |
| 5,009,483 A | 4/1991 | Rockwell et al. | |
| 5,033,814 A | 7/1991 | Brown et al. | |
| 5,052,765 A * | 10/1991 | Moss | G03H 1/20 |
| | | | 359/9 |
| 5,053,834 A | 10/1991 | Simmonds | |
| 5,063,441 A | 11/1991 | Lipton et al. | |
| 5,096,282 A | 3/1992 | Margerum et al. | |
| 5,099,343 A | 3/1992 | Margerum et al. | |
| 5,110,034 A | 5/1992 | Simmonds et al. | |
| 5,117,302 A | 5/1992 | Lipton | |
| 5,119,454 A | 6/1992 | McMahon et al. | |
| 5,139,192 A | 8/1992 | Simmonds et al. | |
| 5,142,357 A | 8/1992 | Lipton et al. | |
| 5,142,644 A | 8/1992 | Vansteenkiste et al. | |
| 5,148,302 A | 9/1992 | Nagano et al. | |
| 5,181,133 A | 1/1993 | Lipton | |
| 5,193,000 A | 3/1993 | Lipton et al. | |
| 5,198,912 A | 3/1993 | Ingwall et al. | |
| 5,200,861 A | 4/1993 | Moskovich et al. | |
| 5,218,480 A | 6/1993 | Moskovich et al. | |
| 5,224,198 A | 6/1993 | Jachimowicz et al. | |
| 5,239,372 A | 8/1993 | Lipton | |
| 5,240,636 A | 8/1993 | Doane et al. | |
| 5,241,337 A | 8/1993 | Betensky et al. | |
| 5,242,476 A | 9/1993 | Bartel et al. | |
| 5,251,048 A | 10/1993 | Doane et al. | |
| 5,264,950 A | 11/1993 | West et al. | |
| 5,268,792 A | 12/1993 | Kreitzer et al. | |

| | | | |
|---|---|---|---|
| 5,284,499 A | 2/1994 | Harvey et al. | |
| 5,295,208 A | 3/1994 | Caulfield et al. | |
| 5,296,967 A | 3/1994 | Moskovich et al. | |
| 5,299,289 A | 3/1994 | Omae et al. | |
| 5,309,283 A | 5/1994 | Kreitzer et al. | |
| 5,313,330 A | 5/1994 | Betensky | |
| 5,315,324 A | 5/1994 | Kubelik et al. | |
| 5,315,419 A | 5/1994 | Saupe et al. | |
| 5,315,440 A | 5/1994 | Betensky et al. | |
| 5,327,269 A | 7/1994 | Tilton et al. | |
| 5,329,363 A | 7/1994 | Moskovich et al. | |
| 5,343,147 A | 8/1994 | Sager et al. | |
| 5,368,770 A | 11/1994 | Saupe et al. | |
| 5,371,626 A | 12/1994 | Betensky | |
| 5,416,510 A | 5/1995 | Lipton et al. | |
| 5,418,871 A | 5/1995 | Revelli et al. | |
| 5,428,480 A | 6/1995 | Betensky et al. | |
| 5,437,811 A | 8/1995 | Doane et al. | |
| 5,452,385 A | 9/1995 | Izumi et al. | |
| 5,453,863 A | 9/1995 | West et al. | |
| 5,455,693 A | 10/1995 | Wreede et al. | |
| 5,455,713 A | 10/1995 | Kreitzer et al. | |
| 5,463,428 A | 10/1995 | Lipton et al. | |
| 5,465,311 A | 11/1995 | Caulfield et al. | |
| 5,476,611 A | 12/1995 | Nolan et al. | |
| 5,481,321 A | 1/1996 | Lipton | |
| 5,485,313 A | 1/1996 | Betensky | |
| 5,493,430 A | 2/1996 | Lu et al. | |
| 5,493,448 A | 2/1996 | Betensky et al. | |
| 5,499,140 A | 3/1996 | Betensky | |
| 5,500,769 A | 3/1996 | Betensky | |
| 5,515,184 A | 5/1996 | Caulfield et al. | |
| 5,516,455 A | 5/1996 | Jacobine et al. | |
| 5,530,566 A | 6/1996 | Kumar | |
| 5,532,875 A | 7/1996 | Betemsky | |
| RE35,310 E | 8/1996 | Moskovich | |
| 5,543,950 A | 8/1996 | Lavrentovich et al. | |
| 5,559,637 A | 9/1996 | Moskovich et al. | |
| 5,572,250 A | 11/1996 | Lipton et al. | |
| 5,576,888 A | 11/1996 | Betensky | |
| 5,585,035 A | 12/1996 | Nerad et al. | |
| 5,593,615 A | 1/1997 | Nerad et al. | |
| 5,619,586 A | 4/1997 | Sibbald et al. | |
| 5,621,529 A | 4/1997 | Gordon et al. | |
| 5,621,552 A | 4/1997 | Coates et al. | |
| 5,625,495 A | 4/1997 | Moskovich et al. | |
| 5,668,614 A | 9/1997 | Chien et al. | |
| 5,677,797 A | 10/1997 | Betensky et al. | |
| 5,680,231 A | 10/1997 | Grinberg et al. | |
| 5,682,255 A | 10/1997 | Friesem et al. | |
| 5,686,931 A | 11/1997 | Fuenfschilling et al. | |
| 5,686,975 A | 11/1997 | Lipton | |
| 5,691,795 A | 11/1997 | Doane et al. | |
| 5,695,682 A | 12/1997 | Doane et al. | |
| 5,706,136 A | 1/1998 | Okuyama et al. | |
| 5,710,645 A | 1/1998 | Phillips et al. | |
| 5,745,266 A | 4/1998 | Smith et al. | |
| 5,745,301 A | 4/1998 | Betensky et al. | |
| 5,748,272 A | 5/1998 | Tanaka et al. | |
| 5,748,277 A | 5/1998 | Huang et al. | |
| 5,751,452 A | 5/1998 | Tanaka et al. | |
| 5,757,546 A | 5/1998 | Lipton et al. | |
| 5,790,314 A | 8/1998 | Duck et al. | |
| 5,798,641 A | 8/1998 | Spagna et al. | |
| 5,808,804 A | 9/1998 | Moskovich | |
| 5,822,089 A | 10/1998 | Phillips et al. | |
| 5,825,448 A | 10/1998 | Bos et al. | |
| 5,831,700 A | 11/1998 | Li et al. | |
| 5,835,661 A | 11/1998 | Tai et al. | |
| 5,841,587 A | 11/1998 | Moskovich et al. | |
| 5,856,842 A | 1/1999 | Tedesco | |
| 5,867,238 A | 2/1999 | Miller et al. | |
| 5,870,228 A | 2/1999 | Kreitzer et al. | |
| 5,875,012 A | 2/1999 | Crawford et al. | |
| 5,877,826 A | 3/1999 | Yang et al. | |
| 5,892,599 A | 4/1999 | Bahuguna | |
| 5,900,987 A | 5/1999 | Kreitzer et al. | |
| 5,900,989 A | 5/1999 | Kreitzer | |
| 5,929,960 A | 7/1999 | West et al. | |

(56)

References Cited

U.S. PATENT DOCUMENTS

| | | | |
|---|---|---|---|
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,949,508 A | 9/1999 | Kumar et al. |
| 5,956,113 A | 9/1999 | Crawford |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,986,746 A | 11/1999 | Metz et al. |
| 5,999,089 A | 12/1999 | Carlson et al. |
| 5,999,282 A | 12/1999 | Suzuki et al. |
| 6,014,187 A | 1/2000 | Taketomi et al. |
| 6,023,375 A | 2/2000 | Kreitzer |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,094,311 A | 7/2000 | Moskovich |
| 6,097,551 A | 8/2000 | Kreitzer |
| 6,104,448 A | 8/2000 | Doane et al. |
| 6,115,152 A | 9/2000 | Popovich et al. |
| 6,128,058 A | 10/2000 | Walton et al. |
| 6,133,971 A | 10/2000 | Silverstein et al. |
| 6,133,975 A | 10/2000 | Li et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,188,462 B1 | 2/2001 | Lavrentovich et al. |
| 6,191,887 B1 | 2/2001 | Michaloski et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,228 B2 | 11/2001 | Popovich et al. |
| 6,320,563 B1 | 11/2001 | Yang et al. |
| 6,324,014 B1 | 11/2001 | Moskovich et al. |
| 6,330,109 B1 | 12/2001 | Ishii et al. |
| 6,366,281 B1 | 4/2002 | Lipton et al. |
| 6,377,238 B1 | 4/2002 | McPheters |
| 6,377,321 B1 | 4/2002 | Khan et al. |
| 6,388,797 B1 | 5/2002 | Lipton et al. |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,476,974 B1 | 11/2002 | Kreitzer et al. |
| 6,483,303 B2 | 11/2002 | Simmonds et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,529,336 B1 | 3/2003 | Kreitzer et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,594,090 B2 | 7/2003 | Kruschwitz et al. |
| 6,597,176 B2 | 7/2003 | Simmonds et al. |
| 6,597,475 B1 | 7/2003 | Shirakura et al. |
| 6,600,590 B2 | 7/2003 | Roddy et al. |
| 6,618,104 B1 | 9/2003 | Date et al. |
| 6,625,381 B2 | 9/2003 | Roddy et al. |
| 6,646,772 B1 | 11/2003 | Popovich et al. |
| 6,667,134 B1 | 12/2003 | Sutherland et al. |
| 6,677,086 B1 | 1/2004 | Sutehrland et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,747,781 B2 | 6/2004 | Trisnadi et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amital |
| 6,830,789 B2 | 12/2004 | Doane et al. |
| 6,833,955 B2 | 12/2004 | Niv |
| 6,847,488 B2 | 1/2005 | Travis |
| 6,850,210 B1 | 2/2005 | Lipton et al. |
| 6,853,493 B2 | 2/2005 | Kreitzer et al. |
| 6,867,888 B2 | 3/2005 | Sutherland et al. |
| 6,878,494 B2 | 4/2005 | Sutehrland et al. |
| 6,927,570 B2 | 8/2005 | Simmonds et al. |
| 6,927,694 B1 | 8/2005 | Smith et al. |
| 6,950,173 B1 | 9/2005 | Sutherland et al. |
| 6,952,435 B2 | 10/2005 | Lai et al. |
| 6,958,868 B1 | 10/2005 | Pender |
| 6,963,454 B1 | 11/2005 | Martins et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,019,793 B2 | 3/2006 | Moskovich et al. |
| 7,021,777 B2 | 4/2006 | Amitai |
| 7,026,892 B2 | 4/2006 | Kajiya |
| 7,054,045 B2 | 5/2006 | McPheters et al. |
| 7,068,405 B2 | 6/2006 | Sutherland et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,099,080 B2 | 8/2006 | Lipton et al. |
| 7,108,383 B1 | 9/2006 | Mitchell et al. |
| 7,119,965 B1 | 10/2006 | Rolland et al. |
| 7,123,421 B1 | 10/2006 | Moskovich et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,167,286 B2 | 1/2007 | Anderson et al. |
| 7,175,780 B1 | 2/2007 | Sutherland et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,198,737 B2 | 4/2007 | Natarajan et al. |
| 7,206,107 B2 | 4/2007 | Levola |
| 7,230,770 B2 | 6/2007 | Kreitzer et al. |
| 7,256,915 B2 | 8/2007 | Sutherland et al. |
| 7,265,882 B2 | 9/2007 | Sutherland et al. |
| 7,265,903 B2 | 9/2007 | Sutherland et al. |

(56) References Cited

U.S. PATENT DOCUMENTS

| | | | |
|---|---|---|---|
| RE39,911 E | 11/2007 | Moskovich |
| 7,301,601 B2 | 11/2007 | Lin et al. |
| 7,312,906 B2 | 12/2007 | Sutherland et al. |
| 7,333,685 B2 | 2/2008 | Stone et al. |
| 7,375,886 B2 | 5/2008 | Lipton et al. |
| 7,391,573 B2 | 6/2008 | Amitai |
| 7,413,678 B1 | 8/2008 | Natarajan et al. |
| 7,413,679 B1 | 8/2008 | Sutherland et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,453,612 B2 | 11/2008 | Mukawa |
| 7,454,103 B2 | 11/2008 | Parriaux |
| 7,457,040 B2 | 11/2008 | Amitai |
| 7,477,206 B2 | 1/2009 | Cowan et al. |
| 7,499,217 B2 | 3/2009 | Cakmakci et al. |
| 7,511,891 B2 | 3/2009 | Messerschmidt |
| 7,522,344 B1 | 4/2009 | Curatu et al. |
| 7,570,322 B1 | 8/2009 | Sutherland et al. |
| 7,570,405 B1 | 8/2009 | Sutherland et al. |
| 7,577,326 B2 | 8/2009 | Amital |
| 7,583,423 B2 | 9/2009 | Sutherland et al. |
| 7,589,901 B2 | 9/2009 | DeJong et al. |
| 7,605,882 B1 | 10/2009 | Sutherland et al. |
| 7,619,739 B1 | 11/2009 | Sutherland et al. |
| 7,639,208 B1 | 12/2009 | Ha et al. |
| 7,643,214 B2 | 1/2010 | Amitai |
| 7,672,055 B2 | 3/2010 | Amitai |
| 7,672,549 B2 | 3/2010 | Ghosh et al. |
| 7,710,622 B2 | 5/2010 | Takabayashi et al. |
| 7,724,443 B2 | 5/2010 | Amitai |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,843,642 B2 | 11/2010 | Shaoulov et al. |
| 7,866,869 B2 | 1/2011 | Karakawa |
| 7,872,707 B1 | 1/2011 | Sutherland et al. |
| 7,884,593 B2 | 2/2011 | Simmonds et al. |
| 7,884,985 B2 | 2/2011 | Amitai et al. |
| 7,907,342 B2 | 3/2011 | Simmonds et al. |
| 7,936,519 B2 | 5/2011 | Mukawa et al. |
| 7,944,616 B2 | 5/2011 | Mukawa |
| 7,949,214 B2 | 5/2011 | DeJong et al. |
| 7,969,657 B2 | 6/2011 | Cakmakci et al. |
| 8,000,020 B2 | 8/2011 | Amitai et al. |
| 8,014,050 B2 | 9/2011 | McGrew |
| 8,016,475 B2 | 9/2011 | Travis |
| 8,018,579 B1 | 9/2011 | Krah |
| 8,023,783 B2 | 9/2011 | Mukawa et al. |
| 8,073,296 B2 | 12/2011 | Mukawa et al. |
| 8,077,274 B2 | 12/2011 | Sutherland et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,134,434 B2 | 3/2012 | Diederichs et al. |
| 8,142,016 B2 | 3/2012 | Legerton et al. |
| 8,155,489 B2 | 4/2012 | Saarikko et al. |
| 8,160,411 B2 | 4/2012 | Levola et al. |
| 8,167,173 B1 | 5/2012 | Simmonds et al. |
| 8,194,325 B2 | 6/2012 | Levola et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,294,749 B2 | 10/2012 | Cable |
| 8,310,327 B2 | 11/2012 | Willers et al. |
| 8,314,993 B2 | 11/2012 | Levola et al. |
| 8,320,032 B2 | 11/2012 | Levola |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,351,744 B2 | 1/2013 | Travis et al. |
| 8,354,640 B2 | 1/2013 | Hamre et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,396,339 B2 | 3/2013 | Mukawa et al. |
| 8,422,840 B2 | 4/2013 | Large |
| 8,432,614 B2 | 4/2013 | Amitai |
| 8,441,731 B2 | 5/2013 | Sprague |
| 8,466,953 B2 | 6/2013 | Levola |
| 8,472,120 B2 | 6/2013 | Border et al. |
| 8,481,130 B2 | 7/2013 | Harding et al. |
| 8,482,858 B2 | 7/2013 | Sprague |
| 8,488,246 B2 | 7/2013 | Border et al. |
| 8,491,136 B2 | 7/2013 | Travis et al. |
| 8,493,662 B2 | 7/2013 | Noui |
| 8,494,229 B2 | 7/2013 | Jarvenpaa et al. |
| 8,520,309 B2 | 8/2013 | Sprague |
| 8,547,638 B2 | 10/2013 | Levola |
| 8,548,290 B2 | 10/2013 | Travers et al. |
| 8,565,560 B2 | 10/2013 | Popovich et al. |
| 8,582,206 B2 | 11/2013 | Travis |
| 8,593,734 B2 | 11/2013 | Laakkonen |
| 8,611,014 B2 | 12/2013 | Valera et al. |
| 8,634,120 B2 | 1/2014 | Popovich et al. |
| 8,639,072 B2 | 1/2014 | Popovich et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,698,705 B2 | 4/2014 | Burke |
| 8,731,350 B1 | 5/2014 | Lin et al. |
| 8,736,963 B2 | 5/2014 | Robbins et al. |
| 8,746,008 B1 | 6/2014 | Mauritsen et al. |
| 8,786,923 B2 | 7/2014 | Chuang et al. |
| 8,810,913 B2 | 8/2014 | Simmonds et al. |
| 8,810,914 B2 | 8/2014 | Amitai |
| 8,817,350 B1 | 8/2014 | Robbins et al. |
| 8,824,836 B2 | 9/2014 | Sugiyama |
| 8,830,584 B2 | 9/2014 | Saarikko et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,865 B1 | 12/2014 | Bennett |
| 8,917,453 B2 | 12/2014 | Bohn |
| 8,937,771 B2 | 1/2015 | Robbins et al. |
| 8,950,867 B2 | 2/2015 | Macnamara |
| 8,964,298 B2 | 2/2015 | Haddick et al. |
| 8,965,152 B2 | 2/2015 | Simmonds |
| 8,985,803 B2 | 3/2015 | Bohn |
| 8,989,535 B2 | 3/2015 | Robbins |
| 9,019,595 B2 | 4/2015 | Jain |
| 9,025,253 B2 | 5/2015 | Hadad et al. |
| 9,035,344 B2 | 5/2015 | Jain |
| 9,075,184 B2 | 7/2015 | Popovich et al. |
| 9,081,178 B2 | 7/2015 | Simmonds et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,201,270 B2 | 12/2015 | Fattal et al. |
| 9,215,293 B2 | 12/2015 | Miller |
| 9,269,854 B2 | 2/2016 | Jain |
| 9,274,338 B2 | 3/2016 | Robbins et al. |
| 9,310,566 B2 | 4/2016 | Valera et al. |
| 9,329,325 B2 | 5/2016 | Simmonds et al. |
| 9,341,846 B2 | 5/2016 | Popovich et al. |
| 9,354,366 B2 | 5/2016 | Jain |
| 9,366,862 B2 | 6/2016 | Haddick et al. |
| 9,372,347 B1 | 6/2016 | Levola et al. |

(56) References Cited

U.S. PATENT DOCUMENTS

| | | |
|---|---|---|
| 9,377,623 B2 | 6/2016 | Robbins et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,431,794 B2 | 8/2016 | Jain |
| 9,459,451 B2 | 10/2016 | Saarikko et al. |
| 9,465,213 B2 | 10/2016 | Simmonds |
| 9,494,799 B2 | 11/2016 | Robbins et al. |
| 9,541,383 B2 | 1/2017 | Abovitz et al. |
| 9,547,174 B2 | 1/2017 | Gao et al. |
| 9,551,874 B2 | 1/2017 | Amitai |
| 9,551,880 B2 | 1/2017 | Amital |
| 9,612,403 B2 | 4/2017 | Abovitz et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,727,772 B2 | 8/2017 | Popovich et al. |
| 9,746,688 B2 | 8/2017 | Popovich et al. |
| 10,569,449 B1 | 2/2020 | Curts et al. |
| 10,578,876 B1 | 3/2020 | Lam et al. |
| 10,598,938 B1 | 3/2020 | Huang et al. |
| 10,613,268 B1 | 4/2020 | Colburn et al. |
| 10,649,119 B2 | 5/2020 | Mohanty et al. |
| 10,690,831 B2 | 6/2020 | Calafiore |
| 10,732,351 B2 | 8/2020 | Colburn et al. |
| 10,823,887 B1 | 11/2020 | Calafiore et al. |
| 10,983,257 B1 | 4/2021 | Colburn et al. |
| 11,103,892 B1 | 8/2021 | Liao et al. |
| 11,107,972 B2 | 8/2021 | Diest et al. |
| 11,137,603 B2 | 10/2021 | Zhang |
| 11,243,333 B1 | 2/2022 | Ouderkirk et al. |
| 11,306,193 B1 | 4/2022 | Lane et al. |
| 11,307,357 B2 | 4/2022 | Mohanty |
| 11,340,386 B1 | 5/2022 | Ouderkirk et al. |
| 11,391,950 B2 | 7/2022 | Calafiore |
| 2001/0043163 A1 | 11/2001 | Waldern et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0036825 A1 | 3/2002 | Lipton et al. |
| 2002/0047837 A1 | 4/2002 | Suyama et al. |
| 2002/0110077 A1 | 8/2002 | Drobot et al. |
| 2002/0126332 A1 | 9/2002 | Popovich |
| 2002/0196332 A1 | 12/2002 | Lipton et al. |
| 2003/0007070 A1 | 1/2003 | Lipton et al. |
| 2003/0038912 A1 | 2/2003 | Broer et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0197157 A1 | 10/2003 | Sutherland et al. |
| 2003/0202247 A1 | 10/2003 | Niv et al. |
| 2004/0004767 A1 | 1/2004 | Song |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0141217 A1 | 7/2004 | Endo et al. |
| 2004/0175627 A1 | 9/2004 | Sutherland et al. |
| 2004/0179251 A1 | 9/2004 | Anderson et al. |
| 2004/0179764 A1 | 9/2004 | Melikechi et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0141066 A1 | 6/2005 | Ouchi |
| 2005/0180687 A1 | 8/2005 | Amital |
| 2005/0195276 A1 | 9/2005 | Lipton et al. |
| 2005/0232530 A1 | 10/2005 | Kekas |
| 2005/0265585 A1 | 12/2005 | Rowe |
| 2005/0271258 A1 | 12/2005 | Rowe |
| 2005/0286133 A1 | 12/2005 | Lipton |
| 2006/0012878 A1 | 1/2006 | Lipton et al. |
| 2006/0043938 A1 | 3/2006 | O'Gorman et al. |
| 2006/0119837 A1 | 6/2006 | Raguin et al. |
| 2006/0126141 A1 | 6/2006 | Hirao et al. |
| 2006/0132914 A1 | 6/2006 | Weiss et al. |
| 2006/0146422 A1 | 7/2006 | Koike |
| 2006/0171647 A1 | 8/2006 | Ye et al. |
| 2006/0191293 A1 | 8/2006 | Kuczma |
| 2006/0215244 A1 | 9/2006 | Yosha et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0284974 A1 | 12/2006 | Lipton et al. |
| 2006/0285205 A1 | 12/2006 | Lipton et al. |
| 2006/0291052 A1 | 12/2006 | Lipton et al. |
| 2007/0012777 A1 | 1/2007 | Tsikos et al. |
| 2007/0019152 A1 | 1/2007 | Caputo et al. |
| 2007/0041684 A1 | 2/2007 | Popovich et al. |
| 2007/0070476 A1 | 3/2007 | Yamada et al. |
| 2007/0097502 A1 | 5/2007 | Lipton et al. |
| 2007/0109401 A1 | 5/2007 | Lipton et al. |
| 2007/0133089 A1 | 6/2007 | Lipton et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0183650 A1 | 8/2007 | Lipton et al. |
| 2007/0188602 A1 | 8/2007 | Cowan et al. |
| 2007/0206155 A1 | 9/2007 | Lipton |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2007/0291342 A1* | 12/2007 | Yasuda .............. G11B 7/00772 |
| | | 359/25 |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0186573 A1 | 8/2008 | Lipton |
| 2008/0186574 A1 | 8/2008 | Robinson et al. |
| 2008/0198471 A1 | 8/2008 | Amitai |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0285137 A1 | 11/2008 | Simmonds et al. |
| 2008/0297731 A1 | 12/2008 | Powell et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0316303 A1 | 12/2008 | Chiu et al. |
| 2008/0316375 A1 | 12/2008 | Lipton et al. |
| 2009/0052047 A1 | 2/2009 | Amitai |
| 2009/0074356 A1 | 3/2009 | Sanchez et al. |
| 2009/0128495 A1 | 5/2009 | Kong et al. |
| 2009/0128911 A1 | 5/2009 | Itzkovitch et al. |
| 2009/0141324 A1 | 6/2009 | Mukawa |
| 2009/0190222 A1 | 7/2009 | Simmonds et al. |
| 2009/0242021 A1 | 10/2009 | Petkie et al. |
| 2009/0296218 A1 | 12/2009 | Ryytty |
| 2009/0303599 A1 | 12/2009 | Levola |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0079865 A1 | 4/2010 | Saarikko et al. |
| 2010/0086256 A1 | 4/2010 | Ben Bakir et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |

(56)  References Cited

U.S. PATENT DOCUMENTS

| 2010/0134534 A1 | 6/2010 | Seesselberg et al. |
| 2010/0149073 A1 | 6/2010 | Chaum et al. |
| 2010/0220293 A1 | 9/2010 | Mizushima et al. |
| 2010/0231532 A1 | 9/2010 | Nho et al. |
| 2010/0246003 A1 | 9/2010 | Simmonds et al. |
| 2010/0246004 A1 | 9/2010 | Simmonds |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0321781 A1 | 12/2010 | Levola et al. |
| 2011/0019874 A1 | 1/2011 | Jarvenpaa et al. |
| 2011/0026128 A1 | 2/2011 | Baker et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0063604 A1 | 3/2011 | Hamre et al. |
| 2011/0102711 A1 | 5/2011 | Sutherland et al. |
| 2011/0109880 A1 | 5/2011 | Nummela |
| 2011/0187293 A1 | 8/2011 | Travis et al. |
| 2011/0235179 A1 | 9/2011 | Simmonds |
| 2011/0236803 A1 | 9/2011 | Weiser et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0120493 A1 | 5/2012 | Simmonds et al. |
| 2012/0162549 A1 | 6/2012 | Gao et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0235886 A1 | 9/2012 | Border et al. |
| 2012/0290973 A1 | 11/2012 | Robertson et al. |
| 2012/0300311 A1 | 11/2012 | Simmonds et al. |
| 2013/0016324 A1 | 1/2013 | Travis |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0143336 A1 | 6/2013 | Jain |
| 2013/0163089 A1 | 6/2013 | Bohn |
| 2013/0176704 A1 | 7/2013 | Lanman et al. |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0322810 A1 | 12/2013 | Robbins |
| 2013/0342525 A1 | 12/2013 | Benko et al. |
| 2014/0003762 A1 | 1/2014 | Macnamara |
| 2014/0024159 A1 | 1/2014 | Jain |
| 2014/0055845 A1 | 2/2014 | Jair |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0160576 A1 | 6/2014 | Robbins et al. |
| 2014/0168735 A1 | 6/2014 | Yuan et al. |
| 2014/0168783 A1 | 6/2014 | Luebke et al. |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0267420 A1 | 9/2014 | Schowengerdt et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0125109 A1 | 5/2015 | Robbins et al. |
| 2015/0148728 A1 | 5/2015 | Sallum et al. |
| 2015/0185475 A1 | 7/2015 | Saarikko et al. |
| 2015/0235447 A1 | 8/2015 | Abovitz et al. |
| 2015/0235448 A1 | 8/2015 | Schowengerdt et al. |
| 2015/0247975 A1 | 9/2015 | Abovitz et al. |
| 2015/0260994 A1 | 9/2015 | Akutsu et al. |
| 2015/0268415 A1 | 9/2015 | Schowengerdt et al. |
| 2015/0277375 A1 | 10/2015 | Large et al. |
| 2015/0288129 A1 | 10/2015 | Jain |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0042757 A1 | 2/2016 | Onoe |
| 2016/0077338 A1 | 3/2016 | Robbins et al. |
| 2016/0085300 A1 | 3/2016 | Robbins et al. |
| 2016/0116739 A1 | 4/2016 | TeKolste et al. |
| 2016/0124223 A1 | 5/2016 | Shinbo et al. |
| 2016/0132025 A1 | 5/2016 | Taff et al. |
| 2016/0195664 A1 | 7/2016 | Fattal et al. |
| 2016/0209648 A1 | 7/2016 | Haddick et al. |
| 2016/0231568 A1 | 8/2016 | Saarikko et al. |
| 2016/0266398 A1 | 9/2016 | Poon et al. |
| 2016/0274362 A1 | 9/2016 | Tinch et al. |
| 2016/0299344 A1 | 10/2016 | Dobschal et al. |
| 2016/0320536 A1 | 11/2016 | Simmonds et al. |

(56) References Cited

U.S. PATENT DOCUMENTS

| | | |
|---|---|---|
| 2016/0327705 A1 | 11/2016 | Simmonds et al. |
| 2016/0341964 A1 | 11/2016 | Amitai |
| 2017/0003505 A1 | 1/2017 | Vallius et al. |
| 2017/0010488 A1 | 1/2017 | Klug et al. |
| 2017/0030550 A1 | 2/2017 | Popovich et al. |
| 2017/0031171 A1 | 2/2017 | Vallius et al. |
| 2017/0034435 A1 | 2/2017 | Vallius |
| 2017/0038579 A1 | 2/2017 | Yeoh et al. |
| 2017/0052376 A1 | 2/2017 | Amitai et al. |
| 2017/0059759 A1 | 3/2017 | Ayres et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131546 A1 | 5/2017 | Woltman et al. |
| 2017/0131551 A1 | 5/2017 | Robbins et al. |
| 2017/0180404 A1 | 6/2017 | Bersch et al. |
| 2017/0180408 A1 | 6/2017 | Yu et al. |
| 2017/0219841 A1 | 8/2017 | Popovich et al. |
| 2017/0299860 A1 | 10/2017 | Wall et al. |
| 2019/0212573 A1 | 7/2019 | Popovich et al. |
| 2019/0212588 A1 | 7/2019 | Waldern et al. |
| 2019/0339558 A1 | 11/2019 | Waldern et al. |
| 2020/0247016 A1 | 8/2020 | Calafiore |
| 2020/0249568 A1 | 8/2020 | Rao et al. |
| 2020/0363771 A1* | 11/2020 | Waldern .............. G03H 1/0408 |
| 2021/0109285 A1 | 4/2021 | Jiang et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0238374 A1 | 8/2021 | Ye et al. |
| 2022/0019015 A1 | 1/2022 | Calafiore et al. |
| 2022/0082739 A1 | 3/2022 | Franke et al. |
| 2022/0091323 A1 | 3/2022 | Yaroshchuk et al. |
| 2022/0204790 A1 | 6/2022 | Zhang et al. |
| 2022/0206232 A1 | 6/2022 | Zhang et al. |

FOREIGN PATENT DOCUMENTS

| | | |
|---|---|---|
| CN | 101103297 A | 1/2008 |
| CN | 100492099 C | 5/2009 |
| CN | 104204901 A | 12/2014 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| DE | 19751190 A1 | 5/1999 |
| DE | 102012108424 A1 | 3/2014 |
| EP | 0795775 A2 | 9/1997 |
| EP | 1413972 A1 | 4/2004 |
| EP | 1526709 A2 | 4/2005 |
| EP | 1748305 A1 | 1/2007 |
| EP | 1413972 B1 | 10/2008 |
| EP | 2110701 A1 | 10/2009 |
| EP | 2244114 A1 | 10/2010 |
| EP | 2326983 A1 | 6/2011 |
| EP | 1828832 B1 | 5/2013 |
| EP | 2733517 A1 | 5/2014 |
| EP | 1573369 B1 | 7/2014 |
| EP | 2929378 A1 | 10/2015 |
| EP | 2748670 B1 | 11/2015 |
| EP | 2995986 A1 | 3/2016 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 02186319 A | 7/1990 |
| JP | 03239384 A | 10/1991 |
| JP | 06294952 A | 10/1994 |
| JP | 07098439 A | 4/1995 |
| JP | 0990312 A | 4/1997 |
| JP | 11109320 A | 4/1999 |
| JP | 11142806 A | 5/1999 |
| JP | 2953444 B2 | 9/1999 |
| JP | 2000056259 A | 2/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2003066428 A | 3/2003 |
| JP | 2003270419 A | 9/2003 |
| JP | 2008112187 A | 5/2008 |
| JP | 2009036955 A | 2/2009 |
| JP | 2009211091 A | 9/2009 |
| JP | 4367775 B2 | 11/2009 |
| JP | 2012137616 A | 7/2012 |
| JP | 5303928 B2 | 10/2013 |
| KR | 20100092059 A | 8/2010 |
| KR | 20140140063 A | 12/2014 |
| KR | 20140142337 A | 12/2014 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 2000016136 A1 | 3/2000 |
| WO | 2000023830 | 4/2000 |
| WO | 2000023847 | 4/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008100545 A2 | 8/2008 |
| WO | 2008011066 A3 | 12/2008 |
| WO | 2009013597 A2 | 1/2009 |
| WO | 2009077802 A1 | 6/2009 |
| WO | 2009077803 A1 | 6/2009 |
| WO | 2009101238 A1 | 8/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010078856 A1 | 7/2010 |
| WO | 2010104692 A2 | 9/2010 |
| WO | 2010122330 A1 | 10/2010 |

(56)       References Cited

FOREIGN PATENT DOCUMENTS

| | | | |
|---|---|---|---|
| WO | 2010125337 A2 | 11/2010 |
| WO | 2011032005 A2 | 3/2011 |
| WO | 2011042711 A2 | 4/2011 |
| WO | 2011051660 A1 | 5/2011 |
| WO | 2011055109 A2 | 5/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012158950 A1 | 11/2012 |
| WO | 2012172295 A1 | 12/2012 |
| WO | 2013027004 A1 | 2/2013 |
| WO | 2013034879 A1 | 3/2013 |
| WO | 2013049012 A1 | 4/2013 |
| WO | 2013102759 A2 | 7/2013 |
| WO | 2013167864 A1 | 11/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020643 A1 | 2/2016 |
| WO | 2016025350 A1 | 2/2016 |
| WO | 2016046514 A1 | 3/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113534 A1 | 7/2016 |
| WO | 2016118107 A1 | 7/2016 |
| WO | 2016122679 A1 | 8/2016 |
| WO | 2016181108 A1 | 11/2016 |
| WO | 2017060665 A1 | 4/2017 |
| WO | 2017162999 A1 | 9/2017 |
| WO | 2017180403 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018096359 A3 | 7/2018 |
| WO | 2018150163 A1 | 8/2018 |
| WO | 2019077307 A1 | 4/2019 |
| WO | 2019122806 A1 | 6/2019 |
| WO | 2019171038 A1 | 9/2019 |
| WO | 2020212682 A1 | 10/2020 |
| WO | 2021032982 A1 | 2/2021 |
| WO | 2021032983 A1 | 2/2021 |
| WO | 2021044121 A1 | 3/2021 |
| WO | 2022165514 A1 | 8/2022 |

OTHER PUBLICATIONS

Magarinos et al., "Wide Angle Color Holographic infinity optics display", Air Force Systems Command, Brooks Air Force Base, Texas, AFHRL-TR-80-53, Mar. 1981, 100 pgs.

Marino et al., "Dynamical Behaviour of Policryps Gratings", Electronic-Liquid Crystal Communications, Feb. 5, 2004, 10 pgs.

Massenot et al., "Multiplexed holographic transmission gratings recorded in holographic polymer-dispersed liquid crystals: static and dynamic studies", Applied Optics, 2005, vol. 44, Issue 25, pp. 5273-5280.

Matay et al., "Planarization of Microelectronic Structures by Using Polyimides", Journal of Electrical Engineering, 2002, vol. 53, No. 3-4, pp. 86-90.

Mathews, "The LED FAQ Pages", Jan. 31, 2002, 23 pgs.

Matic, "Blazed phase liquid crystal beam steering", Proc. of the SPIE, 1994, vol. 2120, pp. 194-205.

McLeod, "Axicons and Their Uses", Journal of the Optical Society of America, Feb. 1960, vol. 50, No. 2, pp. 166-169.

McManamon et al., "A Review of Phased Array Steering for Narrow-Band Electrooptical Systems", Proceedings of the IEEE, Jun. 2009, vol. 97, No. 6, pp. 1078-1096.

McManamon et al., "Optical Phased Array Technology", Proceedings of the IEEE, Feb. 1996, vol. 84, Issue 2, pp. 268-298.

Miller, "Coupled Wave Theory and Waveguide Applications", The Bell System Technical Journal, Short Hills, NJ, Feb. 2, 1954, 166 pgs.

Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.

Nair et al., "Two-Stage Reactive Polymer Network Forming Systems", Advanced Functional Materials, 2012, pp. 1-9, DOI: 10.1002/adfm.201102742.

Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.

Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.

Natarajan et al., "Holographic polymer dispersed liquid crystal reflection gratings formed by visible light initiated thiol-ene photopolymerization", Polymer, vol. 47, May 8, 2006, pp. 4411-4420.

Naydenova et al., "Low-scattering Volume Holographic Material", DIT PhD Project, http://www.dit.ie/ieo/, Oct. 2017, 2 pgs.

Neipp et al., "Non-local polymerization driven diffusion based model: general dependence of the polymerization rate to the exposure intensity", Optics Express, Aug. 11, 2003, vol. 11, No. 16, pp. 1876-1886.

Nishikawa et al., "Mechanically and Light Induced Anchoring of Liquid Crystal on Polyimide Film", Mol. Cryst. Liq. Cryst., Aug. 1999, vol. 329, 8 pgs.

Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.

Oh et al., "Achromatic diffraction from polarization gratings with high efficiency", Optic Letters, Oct. 15, 2008, vol. 33, No. 20, pp. 2287-2289.

Olson et al., "Templating Nanoporous Polymers with Ordered Block Copolymers", Chemistry of Materials, Web publication Nov. 27, 2007, vol. 20, pp. 869-890.

Ondax, Inc., "Volume Holographic Gratings (VHG)", 2005, 7 pgs.

Orcutt, "Coming Soon: Smart Glasses That Look Like Regular Spectacles", Intelligent Machines, Jan. 9, 2014, 4 pgs.

Osredkar, "A study of the limits of spin-on-glass planarization process", Informacije MIDEM, 2001, vol. 31, 2, ISSN0352-9045, pp. 102-105.

(56) References Cited

OTHER PUBLICATIONS

Osredkar et al., "Planarization methods in IC fabrication technologies", Informacije MIDEM, 2002, vol. 32, 3, ISSN0352-9045, 5 pgs.

Ou et al., "A Simple LCOS Optical System (Late News)", Industrial Technology Research Institute/OES Lab. Q100/Q200, SID 2002, Boston, USA, 2 pgs.

Paolini et al., "High-Power LED Illuminators in Projection Displays", Lumileds, Aug. 7, 2001, 19 pgs.

Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.

Park et al., "Fabrication of Reflective Holographic Gratings with Polyurethane Acrylates (PUA)", Current Applied Physics, Jun. 2002, vol. 2, pp. 249-252.

Plawsky et al., "Engineered nanoporous and nanostructured films", MaterialsToday, Jun. 2009, vol. 12, No. 6, pp. 36-45.

Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.

Presnyakov et al., "Electrically tunable polymer stabilized liquid-crystal lens", Journal of Applied Physics, Apr. 29, 2005, vol. 97, pp. 103101-1-103101-6.

Qi et al., "P-111: Reflective Display Based on Total Internal Reflection and Grating-Grating Coupling", Society for Information Display Digest, May 2003, pp. 648-651, DOI: 10.1889/1.1832359.

Ramón, "Formation of 3D micro- and nanostructures using liquid crystals as a template", Technische Universiteit Eindhoven, Apr. 17, 2008, Thesis, 117 pgs., DOI:http://dx.doi.org/10.6100/IR634422.

Ramsey, "Holographic Patterning of Polymer Dispersed Liquid Crystal Materials for Diffractive Optical Elements", Thesis, The University of Texas at Arlington, Dec. 2006, 166 pgs.

Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.

Reid, "Thin film silica nanocomposites for anti-reflection coatings", Oxford Advance Surfaces, www.oxfordsurfaces.com, Oct. 18, 2012, 23 pgs.

Riechert, "Speckle Reduction in Projection Systems", Dissertation, University Karlsruhe, 2009, 178 pgs.

Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.

Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.

Saraswat, "Deposition & Planarization", EE 311 Notes, Aug. 29, 2017, 28 pgs.

Schreiber et al., "Laser display with single-mirror MEMS scanner", Journal of the SID 17/7, 2009, pp. 591-595.

Seiberle et al., "Photo-aligned anisotropic optical thin films", Journal of the SID 12/1, 2004, 6 pgs.

Serebriakov et al., "Correction of the phase retardation caused by intrinsic birefringence in deep UV lithography", Proc. of SPIE, May 21, 2010, vol. 5754, pp. 1780-1791.

Shi et al., "Design considerations for high efficiency liquid crystal decentered microlens arrays for steering light", Applied Optics, vol. 49, No. 3, Jan. 20, 2010, pp. 409-421.

Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.

Simonite, "How Magic Leap's Augmented Reality Works", Intelligent Machines, Oct. 23, 2014, 7 pgs.

Smith et al., "RM-PLUS—Overview", Licrivue, Nov. 5, 2013, 16 pgs.

Sony Global, "Sony Releases the Transparent Lens Eyewear 'SmartEyeglass Developer Edition'", printed Oct. 19, 2017, Sony Global—News Releases, 5 pgs.

Steranka et al., "High-Power LEDs—Technology Status and Market Applications", Lumileds, Jul. 2002, 23 pgs.

Stumpe et al., "Active and Passive LC Based Polarization Elements", Mol. Cryst. Liq. Cryst., 2014, vol. 594: pp. 140-149.

Stumpe et al., "New type of polymer-LC electrically switchable diffractive devices—Poliphem", May 19, 2015, p. 97.

Hasan et al., "Tunable-focus lens for adaptive eyeglasses", Optics Express, Jan. 23, 2017, vol. 25, No. 2, 1221, 13 pgs.

Hasman et al., "Diffractive Optics: Design, Realization, and Applications", Fiber and Integrated Optics, vol. 16, 1997, pp. 1-25.

Hata et al., "Holographic nanoparticle-polymer composites based on step-growth thiol-ene photopolymerization", Optical Materials Express, vol. 1, No. 2, Jun. 1, 2011, pp. 207-222.

He et al., "Dynamics of peristrophic multiplexing in holographic polymer-dispersed liquid crystal", Liquid Crystals, Mar. 26, 2014, vol. 41, No. 5, pp. 673-684.

He et al., "Holographic 3D display based on polymer-dispersed liquid-crystal thin films", Proceedings of China Display/Asia Display 2011, pp. 158-160.

He et al., "Properties of Volume Holograms Recording in Photopolymer Films with Various Pulse Exposures Repetition Frequencies", Proceedings of SPIE vol. 5636, Bellingham, WA, 2005, pp. 842-848, doi: 10.1117/12.580978.

Herman et al., "Production and Uses of Diffractionless Beams", J. Opt. Soc. Am. A., Jun. 1991, vol. 8, No. 6, pp. 932-942.

Hisano, "Alignment layer-free molecular ordering induced by masked photopolymerization with nonpolarized light", Appl. Phys. Express 9, Jun. 6, 2016, pp. 072601-1-072601-4.

Hoepfner et al., "LED Front Projection Goes Mainstream", Luminus Devices, Inc., Projection Summit, 2008, 18 pgs.

Holmes et al., "Controlling the Anisotropy of Holographic Polymer-Dispersed Liquid-Crystal Gratings", Physical Review E, Jun. 11, 2002, vol. 65, pp. 066603-1-066603-4.

Hoyle et al., "Advances in the Polymerization of Thiol-Ene Formulations", Heraeus Noblelight Fusion UV Inc., 2003 Conference, 6 pgs.

Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.

Huang et al., "Diffraction properties of substrate guided-wave holograms", Optical Engineering, Oct. 1995, vol. 34, No. 10, pp. 2891-2899.

Huang et al., "Theory and characteristics of holographic polymer dispersed liquid crystal transmission grating with scaffolding morphology", Applied Optics, Jun. 20, 2012, vol. 51, No. 18, pp. 4013-4020.

Iannacchione et al., "Deuterium NMR and morphology study of copolymer-dispersed liquid-crystal Bragg gratings", Europhysics Letters, 1996, vol. 36, No. 6, pp. 425-430.

Jeng et al., "Aligning liquid crystal molecules", SPIE, 2012, 10.1117/2.1201203.004148, 2 pgs.

Jo et al., "Control of Liquid Crystal Pretilt Angle using Polymerization of Reactive Mesogen", IMID 2009 Digest, P1-25, 2009, pp. 604-606.

Juhl, "Interference Lithography for Optical Devices and Coatings", Dissertation, University of Illinois at Urbana-Champaign, 2010.

Juhl et al., "Holographically Directed Assembly of Polymer Nanocomposites", ACS Nano, Oct. 7, 2010, vol. 4, No. 10, pp. 5953-5961.

Jurbergs et al., "New recording materials for the holographic industry", Proc. of SPIE, 2009 vol. 7233, pp. 72330K-1-72330L-10, doi: 10.1117/12.809579.

Kahn et al., "Private Line Report on Large Area Display", Kahn International, Jan. 7, 2003, vol. 8, No. 10, 9 pgs.

Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.

(56)            References Cited

OTHER PUBLICATIONS

Karp et al., "Planar micro-optic solar concentration using multiple imaging lenses into a common slab waveguide", Proc. of SPIE vol. 7407, 2009 SPIE, pp. 74070D-1-74070D-11, CCC code: 0277-786X/09, doi: 10.1117/12.826531.

Karp et al., "Planar micro-optic solar concentrator", Optics Express, Jan. 18, 2010, vol. 18, No. 2, pp. 1122-1133.

Kato et al., "Alignment-Controlled Holographic Polymer Dispersed Liquid Crystal (HPDLC) for Reflective Display Devices", SPIE, 1998, vol. 3297, pp. 52-57.

Kessler, "Optics of Near to Eye Displays (NEDs)", Oasis 2013, Tel Aviv, Feb. 19, 2013, 37 pgs.

Keuper et al., "26.1: RGB LED Illuminator for Pocket-Sized Projectors", SID 04 DIGEST, 2004, ISSN/0004-0966X/04/3502, pp. 943-945.

Keuper et al., "P-126: Ultra-Compact LED based Image Projector for Portable Applications", SID 03 DIGEST, 2003, ISSN/0003-0966X/03/3401-0713, pp. 713-715.

Kim et al., "Effect of Polymer Structure on the Morphology and Electro optic Properties of UV Curable PNLCs", Polymer, Feb. 2000, vol. 41, pp. 1325-1335.

Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.

Kim et al., "Fabrication of Reflective Holographic PDLC for Blue", Molecular Crystals and Liquid Crystals Science, 2001, vol. 368, pp. 3845-3853.

Kim et al., "Optimization of Holographic PDLC for Green", Mol. Cryst. Liq. Cryst., vol. 368, 2001, pp. 3855-3864.

Klein, "Optical Efficiency for Different Liquid Crystal Colour Displays", Digital Media Department, HPL-2000-83, Jun. 29, 2000, 18 pgs.

Kogelnik, "Coupled Wave Theory for Thick Hologram Gratings", The Bell System Technical Journal, vol. 48, No. 9, Nov. 1969, pp. 2909-2945.

Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.

Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.

Lauret et al., "Solving the Optics Equation for Effective LED Applications", Gaggione North America, LLFY System Design Workshop 2010, Oct. 28, 2010, 26 pgs.

Lee, "Patents Shows Widespread Augmented Reality Innovation", PatentVue, May 26, 2015, 5 pgs.

Levola, "Diffractive optics for virtual reality displays", Journal of the SID, 2006, 14/5, pp. 467-475.

Levola et al., "Near-to-eye display with diffractive exit pupil expander having chevron design", Journal of the SID, 2008, 16/8, pp. 857-862.

Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.

Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.

Li et al., "Light Pipe Based Optical Train and its Applications", Proceedings vol. 5524, Novel Optical Systems Design and Optimization VII, Oct. 24, 2004, doi: 10.1117/12.559833, 10 pgs.

Li et al., "Novel Projection Engine with Dual Paraboloid Reflector and Polarization Recovery Systems", Wavien Inc., SPIE EI 5289-38, Jan. 21, 2004, 49 pgs.

Li et al., "Polymer crystallization/melting induced thermal switching in a series of holographically patterned Bragg reflectors", Soft Matter, Jul. 11, 2005, vol. 1, pp. 238-242.

Lin et al., "Ionic Liquids in Photopolymerizable Holographic Materials", in book: Holograms—Recording Materials and Applications, Nov. 9, 2011, 21 pgs.

Liu et al., "Holographic Polymer Dispersed Liquid Crystals" Materials, Formation and Applications, Advances in OptoElectronics, Nov. 30, 2008, vol. 2008, Article ID 684349, 52 pgs.

Lorek, "Experts Say Mass Adoption of augmented and Virtual Reality is Many Years Away", Siliconhills, Sep. 9, 2017, 4 pgs.

Lowenthal et al., "Speckle Removal by a Slowly Moving Diffuser Associated with a Motionless Diffuser", Journal of the Optical Society of America, Jul. 1971, vol. 61, No. 7, pp. 847-851.

Lu et al., "Polarization switch using thick holographic polymer-dispersed liquid crystal grating", Journal of Applied Physics, vol. 95, No. 3, Feb. 1, 2004, pp. 810-815.

Lu et al., "The Mechanism of electric-field-induced segregation of additives in a liquid-crystal host", Phys Rev E Stat Nonlin Soft Matter Phys., Nov. 7, 2012, 14 pgs.

Ma et al., "Holographic Reversed-Mode Polymer-Stabilized Liquid Crystal Grating", Chinese Phys. Lett., 2005, vol. 22, No. 1, pp. 103-106.

Butler et al., "Diffractive Properties of Highly Birefringent Volume Gratings: Investigation", Journal of Optical Society of America, Feb. 2002, vol. 19, No. 2, pp. 183-189.

Cai et al., "Recent advances in antireflective surfaces based on nanostructure arrays", Materials Horizons, 2015, vol. 2, pp. 37-53, DOI: 10.1038/c4mh00140k.

Cameron, "Optical Waveguide Technology & Its Application In Head Mounted Displays", Proc. of SPIE, May 22, 2012, vol. 8383, pp. 83830E-1-83830E-11, doi: 10.1117/12.923660.

Caputo et al., "Policryps Composite Materials: Features and Applications", Advances in Composite Materials—Analysis of Natural and Man-Made Materials, www.intechopen.com, Sep. 2011, pp. 93-118.

Caputo et al., "Policryps Switchable Holographic Grating: A Promising Grating Electro-Optical Pixel for High Resolution Display Application", Journal of Display Technology, Mar. 2006, vol. 2, No. 1, pp. 38-51, DOI: 10.1109/JDT.2005.864156.

Carclo Optics, "Guide to choosing secondary optics", Carclo Optics, Dec. 15, 2014, www.carclo-optics.com, 48 pgs.

Chen et al., "Polarization rotators fabricated by thermally-switched liquid crystal alignments based on rubbed poly(N-vinyl carbazole) films", Optics Express, Apr. 11, 2011, vol. 19, No. 8, pp. 7553-7558, first published Apr. 5, 2011.

Cheng et al., "Design of an ultra-thin near-eye display with geometrical waveguide and freeform optics", Optics Express, Aug. 2014, 16 pgs., DOI:10.1364/OE.22.020705.

Chi et al., "Ultralow-refractive-index optical thin films through nanoscale etching of ordered mesoporous silica films", Optic Letters, May 1, 2012, vol. 37, No. 9, pp. 1406-1408, first published Apr. 19, 2012.

Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.

Cho et al., "Electro-optic Properties of CO2 Fixed Polymer/Nematic LC Composite Films", Journal of Applied Polymer Science, Nov. 5, 2000, vol. 81, Issue 11, pp. 2744-2753.

Cho et al., "Optimization of Holographic Polymer Dispersed Liquid Crystals for Ternary Monomers", Polymer International, Nov. 1999, vol. 48, pp. 1085-1090.

Colegrove et al., "P-59: Technology of Stacking HPDLC for Higher Reflectance", SID 00 DIGEST, May 2000, pp. 770-773.

Cruz-Arreola et al., "Diffraction of beams by infinite or finite amplitude-phase gratings", Investigacio' N Revista Mexicana De Fi'sica, Feb. 2011, vol. 57, No. 1, pp. 6-16.

Dainty, "Some statistical properties of random speckle patterns in coherent and partially coherent illumination", Optica Acta, Mar. 12, 1970, vol. 17, No. 10, pp. 761-772.

Date, "Alignment Control in Holographic Polymer Dispersed Liquid Crystal", Journal of Photopolymer Science and Technology, Nov. 2, 2000, vol. 13, No. 2, pp. 289-294.

(56) References Cited

OTHER PUBLICATIONS

Date et al., "52.3: Direct-viewing Display Using Alignment-controlled PDLC and Holographic PDLC", Society for Information Display Digest, May 2000, pp. 1184-1187, DOI: 10.1889/1.1832877.

Date et al., "Full-color reflective display device using holographically fabricated polymer-dispersed liquid crystal (HPDLC)", Journal of the SID, 1999, vol. 7, No. 1, pp. 17-22.

De Bitetto, "White light viewing of surface holograms by simple dispersion compensation", Applied Physics Letters, Dec. 15, 1966, vol. 9, No. 12, pp. 417-418.

Developer World, "Create customized augmented reality solutions", printed Oct. 19, 2017, LMX-001 holographic waveguide display, Sony Developer World, 3 pgs.

Dhar et al., "Recording media that exhibit high dynamic range for digital holographic data storage", Optics Letters, Apr. 1, 1999, vol. 24, No. 7, pp. 487-489.

Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.

Drake et al., "Waveguide Hologram Fingerprint Entry Device", Optical Engineering, Sep. 1996, vol. 35, No. 9, pp. 2499-2505.

Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537], DOI: 10.1080/15421400802432584.

Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212, DOI: 10.1063/1.1807027.

Ducharme, "Microlens diffusers for efficient laser speckle generation", Optics Express, Oct. 29, 2007, vol. 15, No. 22, pp. 14573-14579.

Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.

Fattal et al., "A multi directional backlight for a wide-angle glasses-free three-dimensional display", Nature, Mar. 21, 2012, vol. 495, pp. 348-351.

Fontecchio et al., "Spatially Pixelated Reflective Arrays from Holographic Polymer Dispersed Liquid Crystals", SID 00 Digest, May 2000, pp. 774-776.

Forman et al., "Materials development for PhotoINhibited Super-Resolution (PINSR) lithography", Proc. of SPIE, 2012, vol. 8249, pp. 824904-1-824904-9, doi: 10.1117/12.908512.

Forman et al., "Radical diffusion limits to photoinhibited super-resolution lithography", Phys. Chem. Chem. Phys., May 31, 2013, vol. 15, pp. 14862-14867, DOI: 10.1039/c3cp51512.

Friedrich-Schiller, "Spatial Noise and Speckle", Version 1.12.2011, Dec. 2011, Abbe School of Photonics, Jena, Germany, 27 pgs.

Fujii et al., "Nanoparticle-polymer-composite volume gratings incorporating chain-transfer agents for holography and slow-neutron optics", Optics Letters, Apr. 25, 2014, vol. 39, Issue 12, 5 pgs.

Funayama et al., "Proposal of a new type thin film light-waveguide display device using", The International Conference on Electrical Engineering, 2008, No. P-044, 5 pgs.

Gabor, "Laser Speckle and its Elimination", BM Research and Development, Eliminating Speckle Noise, Sep. 1970, vol. 14, No. 5, pp. 509-514.

Gardiner et al., "Bistable liquid-crystals reduce power consumption for high-efficiency smart glazing", SPIE, 2009, 10.1117/2.1200904.1596, 2 pgs.

Giancola, "Holographic Diffuser, Makes Light Work of Screen Tests", Photonics Spectra, 1996, vol. 30, No. 8, pp. 121-122.

Goodman, "Some fundamental properties of speckle", J. Opt. Soc. Am., Nov. 1976, vol. 66, No. 11, pp. 1145-1150.

Goodman, "Statistical Properties of Laser Speckle Patterns", Applied Physics, 1975, vol. 9, Chapter 2, Laser Speckle and Related Phenomena, pp. 9-75.

Goodman et al., "Speckle Reduction by a Moving Diffuser in Laser Projection Displays", The Optical Society of America, 2000, 15 pgs.

Guldin et al., "Self-Cleaning Antireflective Optical Coatings", Nano Letters, Oct. 14, 2013, vol. 13, pp. 5329-5335.

Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.

Han et al., "Study of Holographic Waveguide Display System", Advanced Photonics for Communications, 2014, 4 pgs.

Harbers et al., "I-15.3: LED Backlighting for LCD-HDTV", Journal of the Society for Information Display, 2002, vol. 10, No. 4, pp. 347-350.

Harbers et al., "Performance of High Power LED Illuminators in Color Sequential Projection Displays", Lumileds Lighting, 2007, 4 pgs.

Harbers et al., "Performance of High Power LED Illuminators in Color Sequential Projection Displays", Lumileds, Aug. 7, 2001, 11 pgs.

Harbers et al., "Performance of High-Power LED illuminators in Projection Displays", Proc. Int. Disp. Workshops, Japan. vol. 10, 2003, pp. 1585-1588.

Harding et al., "Reactive Liquid Crystal Materials for Optically Anisotropic Patterned Retarders", Merck, licrivue, 2008, ME-GR-RH-08-010, 20 pgs.

Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.

Hariharan, "Optical Holography: Principles, techniques and applications", Cambridge University Press, 1996, pp. 231-233.

Harris, "Photonic Devices", EE 216 Principals and Models of Semiconductor Devices, Autumn 2002, 20 pgs.

Harrold et al., "3D Display Systems Hardware Research at Sharp Laboratories of Europe: an update", Sharp Laboratories of Europe, Ltd., 7 pgs.

Harthong et al., "Speckle phase averaging in high-resolution color holography", J. Opt. Soc. Am. A, vol. 14, No. 2, Feb. 1997, pp. 405-409.

International Preliminary Report on Patentability for International Application PCT/GB2009/051676, issued Jun. 14, 2011, mailed Jun. 23, 2011, 6 pgs.

International Preliminary Report on Patentability for International Application PCT/GB2011/000349, issued Sep. 18, 2012, mailed Sep. 27, 2012, 10 pgs.

International Preliminary Report on Patentability for International Application PCT/GB2012/000331, issued Oct. 8, 2013, mailed Oct. 17, 2013, 8 pgs.

International Preliminary Report on Patentability for International Application PCT/GB2012/000677, issued Feb. 25, 2014, mailed Mar. 6, 2014, 5 pgs.

International Preliminary Report on Patentability for International Application PCT/GB2013/000005, issued Jul. 8, 2014, mailed Jul. 17, 2014, 12 pgs.

International Preliminary Report on Patentability for International Application PCT/GB2014/000295, issued Feb. 2, 2016, mailed Feb. 11, 2016, 4 pgs.

International Preliminary Report on Patentability for International Application PCT/GB2015/000225, issued Feb. 14, 2017, mailed Feb. 23, 2017, 8 pgs.

International Preliminary Report on Patentability for International Application PCT/GB2015/000274, Issued Mar. 28, 2017, mailed Apr. 6, 2017, 8 pgs.

International Preliminary Report on Patentability for International Application PCT/GB2016/000014, issued Jul. 25, 2017, mailed Aug. 3, 2017, 7 pgs.

International Preliminary Report on Patentability for International Application PCT/US2014/011736, issued Jul. 21, 2015, mailed Jul. 30, 2015, 9 pgs.

(56) References Cited

OTHER PUBLICATIONS

International Preliminary Report on Patentability for International Application PCT/US2016/017091, issued Aug. 15, 2017, mailed Aug. 24, 2017, 5 pgs.

International Search Report and Written Opinion for International Application No. PCT/US2014/011736, completed Apr. 18, 2014, mailed May 8, 2014, 10 pgs.

International Search Report and Written Opinion for International Application No. PCT/US2022/070410, Search completed May 13, 2022, Mailed Jul. 11, 2022, 34 Pgs.

International Search Report and Written Opinion for International Application PCT/GB2009/051676, completed May 10, 2010, mailed May 18, 2010, 7 pgs.

International Search Report and Written Opinion for International Application PCT/US2016/017091, completed by the European Patent Office on Apr. 20, 2016, 7 pgs.

International Search Report for International Application PCT/GB2014/000295, completed Nov. 18, 2014, mailed Jan. 5, 2015, 4 pgs.

International Search Report for International Application PCT/GB2017/000040, mailed Jul. 18, 2017, completed Jul. 10, 2017, 3 pgs.

International Search Report for PCT/GB2011/000349, completed by the European Patent Office on Aug. 17, 2011, 4 pgs.

International Search Report for PCT/GB2012/000331, completed by the European Patent Office on Aug. 29, 2012, 4 pgs.

International Search Report for PCT/GB2012/000677, completed by the European Patent Office on Dec. 10, 2012, 4 pgs.

International Search Report for PCT/GB2013/000005, completed by the European Patent Office on Jul. 16, 2013, 3 pgs.

International Search Report for PCT/GB2015/000203, completed by the European Patent Office on Oct. 9, 2015, 4 pgs.

International Search Report for PCT/GB2015/000225, completed by the European Patent Office on Nov. 10, 2015, mailed Dec. 2, 2016, 5 pgs.

International Search Report for PCT/GB2015/000274, completed by the European Patent Office on Jan. 7, 2016, 4 pgs.

International Search Report for PCT/GB2016/000014, completed by the European Patent Office on Jun. 27, 2016, 4 pgs.

Written Opinion for International Application No. PCT/GB2011/000349, completed Aug. 17, 2011, mailed Aug. 25, 2011, 9 pgs.

Written Opinion for International Application No. PCT/GB2012/000331, completed Aug. 29, 2012, mailed Sep. 6, 2012, 7 pgs.

Written Opinion for International Application No. PCT/GB2012/000677, completed Dec. 10, 2012, mailed Dec. 17, 2012, 4 pgs.

Written Opinion for International Application No. PCT/GB2013/000005, search completed Jul. 16, 2013, mailed Jul. 24, 2013, 11 pgs.

Written Opinion for International Application No. PCT/GB2014/000295, search completed Nov. 18, 2014, mailed Jan. 5, 2015, 3 pgs.

Written Opinion for International Application No. PCT/GB2015/000225, search completed Nov. 10, 2015, mailed Feb. 4, 2016, 7 pgs.

Written Opinion for International Application No. PCT/GB2015/000274, search completed Jan. 7, 2016, mailed Jan. 19, 2016, 7 pgs.

Written Opinion for International Application No. PCT/GB2016/000014, search completed Jun. 27, 2016, mailed Jul. 7, 2016, 6 pgs.

Written Opinion for International Application No. PCT/GB2017/000040, search completed Jul. 10, 2017, mailed Jul. 18, 2017, 6 pgs.

"Agilent ADNS-2051 Optical Mouse Sensor: Data Sheet", Agilent Technologies, Jan. 9, 2002, 40 pgs.

"Application Note—MOXTEK ProFlux Polarizer use with LCOS displays", CRL Opto Limited, http://www.crlopto.com, 2003, 6 pgs.

"Application Note AN16: Optical Considerations for Bridgelux LED Arrays", BridgeLux, Jul. 31, 2010, 23 pgs.

"Application Note: Variable Attenuator for Lasers", Technology and Applications Center, Newport Corporation, www.newport.com, 2006, DS-08067, 6 pgs.

"Bae Systems to Unveil Q-Sight Family of Helmet-Mounted Display at AUSA Symposium", Released on Tuesday, Oct. 9, 2007, 1 pg.

"Beam Steering Using Liquid Crystals", Boulder Nonlinear Systems, Inc., info@bnonlinear.com, May 8, 2001, 4 pgs.

"BragGrate—Deflector: Transmitting Volume Bragg Grating for angular selection and magnification", 2015, www.OptiGrate.com.

"Cree XLamp XP-E LEDs", Cree, Inc., Retrieved from www.cree.com/Xlamp, CLD-DS18 Rev 17, 2013, 17 pgs.

"Desmodur N 3900", Bayer MaterialScience AG, Mar. 18, 2013, www.bayercoatings.com, 4 pgs.

"Digilens—Innovative Augmented Reality Display and Sensor Solutions for OEMs", Jun. 6, 2017, 31 pgs.

"Exotic Optical Components", Building Electro-Optical Systems, Making It All Work, Chapter 7, John Wiley & Sons, Inc., pp. 233-261.

"FHS Lenses Series", Fraen Corporation, www.fraen.com, Jun. 16, 2003, 10 pgs.

"FLP Lens Series for LUXEONTM Rebel and Rebel ES LEDs", Fraen Corporation, www.fraensrl.com, Aug. 7, 2015, 8 pgs.

"Head-up Displays, See-through display for military aviation", BAE Systems, 2016, 3 pgs.

"Holder for LUXEON Rebel—Part No. 180", Polymer Optics Ltd., 2008, 12 pgs.

"LED 7-Segment Displays", Lumex, uk.digikey.com, 2003, UK031, 36 pgs.

"LED325W UVTOP UV LED with Window", Thorlabs, Specifications and Documentation, 21978-S01 Rev. A, Apr. 8, 2011, 5 pgs.

"Liquid Crystal Phases", Phases of Liquid Crystals, http://plc.cwru.edu/tutorial/enhanced/files/lc/phase, Retrieved on Sep. 21, 2004, 6 pgs.

"LiteHUD Head-up display", BAE Systems, 2016, 2 pgs.

Subbarayappa et al., "Bistable Nematic Liquid Crystal Device", Jul. 30, 2009, 14 pgs.

Sun et al., "Effects of multiwalled carbon nanotube on holographic polymer dispersed liquid crystal", Polymers Advanced Technologies, Feb. 19, 2010, DOI: 10.1002/pat.1708, 8 pgs.

Sun et al., "Low-birefringence lens design for polarization sensitive optical systems", Proceedings of SPIE, 2006, vol. 6289, pp. 6289DH-1-6289DH-10, doi: 10.1117/12.679416.

Sun et al., "Transflective multiplexing of holographic polymer dispersed liquid crystal using Si additives", eXPRESS Polymer Letters, 2011, vol. 5, No. 1, pp. 73-81.

Sutherland et al., "Bragg Gratings in an Acrylate Polymer Consisting of Periodic Polymer-Dispersed Liquid-Crystal Planes", Chem. Mater., 1993, vol. 5, pp. 1533-1538.

Sutherland et al., "Electrically switchable volume gratings in polymer-dispersed liquid crystals", Applied Physics Letters, Feb. 28, 1994, vol. 64, No. 9, pp. 1074-1076.

Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.

Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.

Sutherland et al., "The physics of photopolymer liquid crystal composite holographic gratings", presented at SPIE: Diffractive and Holographic Optics Technology San Jose, CA, 1996, SPIE, vol. 2689, pp. 158-169.

Sweatt, "Achromatic triplet using holographic optical elements", Applied Optics, May 1977, vol. 16, No. 5, pp. 1390-1391.

Talukdar, "Technology Forecast: Augmented reality", Changing the economics of Smartglasses, Issue 2, 2016, 5 pgs.

Tao et al., "TiO2 nanocomposites with high refractive index and transparency", J. Mater. Chem., Oct. 4, 2011, vol. 21, pp. 18623-18629.

Tikhomirov et al., "Design of low-haze holographic notch filters", Applied Optics, Jul. 20, 1999, vol. 38, No. 21.

Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.

(56) References Cited

OTHER PUBLICATIONS

Tiziani, "Physical Properties of Speckles", Speckle Metrology, Chapter 2, Academic Press, Inc., 1978, pp. 5-9.

Tominaga et al., "Fabrication of holographic polymer dispersed liquid crystals doped with gold nanoparticles", 2010 Japanese Liquid Crystal Society Annual Meeting, 2 pgs.

Tomita, "Holographic assembly of nanoparticles in photopolymers for photonic applications", The International Society for Optical Engineering, SPIE Newsroom, 2006, 3 pgs., doi: 10.1117/2.1200612.0475.

Trisnadi, "Hadamard Speckle Contrast Reduction", Optics Letters, Jan. 1, 2004, vol. 29, No. 1, pp. 11-13.

Trisnadi, "Speckle contrast reduction in laser projection displays", Proc. SPIE 4657, 2002, 7 pgs.

Tzeng et al., "Axially symmetric polarization converters based on photo-aligned liquid crystal films", Optics Express, Mar. 17, 2008, vol. 16, No. 6, pp. 3768-3775.

Upatnieks et al., "Color Holograms for white light reconstruction", Applied Physics Letters, Jun. 1, 1996, vol. 8, No. 11, pp. 286-287.

Ushenko, "The Vector Structure of Laser Biospeckle Fields and Polarization Diagnostics of Collagen Skin Structures", Laser Physics, 2000, vol. 10, No. 5, pp. 1143-1149.

Valoriani, "Mixed Reality: Dalle demo a un prodotto", Disruptive Technologies Conference, Sep. 23, 2016, 67 pgs.

Van Gerwen et al., "Nanoscaled interdigitated electrode arrays for biochemical sensors", Sensors and Actuators, Mar. 3, 1998, vol. B 49, pp. 73-80.

Vecchi, "Studi Esr Di Sistemi Complessi Basati Su Cristalli Liquidi", Thesis, University of Bologna, Department of Physical and Inorganic Chemistry, 2004-2006, 110 pgs.

Veltri et al., "Model for the photoinduced formation of diffraction gratings in liquid-crystalline composite materials", Applied Physics Letters, May 3, 2004, vol. 84, No. 18, pp. 3492-3494.

Vita, "Switchable Bragg Gratings", Thesis, Universita degli Studi di Napoli Federico II, Nov. 2005, 103 pgs.

Vuzix, "M3000 Smart Glasses, Advanced Waveguide Optics", brochure, Jan. 1, 2017, 2 pgs.

Wang et al., "Liquid-crystal blazed-grating beam deflector", Applied Optics, Dec. 10, 2000, vol. 39, No. 35, pp. 6545-6555.

Wang et al., "Optical Design of Waveguide Holographic Binocular Display for Machine Vision", Applied Mechanics and Materials, Sep. 27, 2013, vols. 427-429, pp. 763-769.

Wang et al., "Speckle reduction in laser projection systems by diffractive optical elements", Applied Optics, Apr. 1, 1998, vol. 37, No. 10, pp. 1770-1775.

Weber et al., "Giant Birefringent Optics in Multilayer Polymer Mirrors", Science, Mar. 31, 2000, vol. 287, pp. 2451-2456.

Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.

Welde et al., "Investigation of methods for speckle contrast reduction", Master of Science in Electronics, Jul. 2010, Norwegian University of Science and Technology, Department of Electronics and Telecommunications, 127 pgs.

White, "Influence of thiol-ene polymer evolution on the formation and performance of holographic polymer dispersed liquid crystals", The 232nd ACS National Meeting, San Francisco, CA, Sep. 10-14, 2006, 1 pg.

Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.

Wilderbeek et al., "Photoinitiated Bulk Polymerization of Liquid Crystalline Thiolene Monomers", Macromolecules, 2002, vol. 35, pp. 8962-8969.

Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.

Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.

Yaqoob et al., "High-speed two-dimensional laser scanner based on Bragg grating stored in photothermorefractive glass", Applied Optics, Sep. 10, 2003, vol. 42, No. 26, pp. 5251-5262.

Yaroshchuk et al., "Stabilization of liquid crystal photoaligning layers by reactive mesogens", Applied Physics Letters, Jul. 14, 2009, vol. 95, pp. 021902-1-021902-3.

Ye, "Three-dimensional Gradient Index Optics Fabricated in Diffusive Photopolymers", Thesis, Department of Electrical, Computer and Energy Engineering, University of Colorado, 2012, 224 pgs.

Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.

Yeralan et al., "Switchable Bragg grating devices for telecommunications applications", Opt. Eng., Aug. 2012, vol. 41, No. 8, pp. 1774-1779.

Yoshida et al., "Nanoparticle-Dispersed Liquid Crystals Fabricated by Sputter Doping", Adv. Mater., 2010, vol. 22, pp. 622-626.

Zhang et al., "Dynamic Holographic Gratings Recorded by Photopolymerization of Liquid Crystalline Monomers", J. Am. Chem. Soc., 1994, vol. 116, pp. 7055-7063.

Zhang et al., "Switchable Liquid Crystalline Photopolymer Media for Holography", J. Am. Chem. Soc., 1992, vol. 114, pp. 1506-1507.

Zhao et al., "Designing Nanostructures by Glancing Angle Deposition", Proc. of SPIE, Oct. 27, 2003, vol. 5219, pp. 59-73.

Zlębacz, "Dynamics of nano and micro objects in complex liquids", Ph.D. dissertation, Institute of Physical Chemistry of the Polish Academy of Sciences, Warsaw 2011, 133 pgs.

Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526, doi:10.1016/j.sna.2006.12.006.

Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.

International Preliminary Report on Patentability for International Application No. PCT/US2022/070410, Report issued Jul. 31, 2023, Mailed Aug. 10, 2023, 9 Pgs.

"LiteHUD Head-up display infographic", BAE Systems, 2017, 2 pgs.

"Luxeon C: Power Light Source", Philips Lumileds, www.philipslumileds.com, 2012, 18 pgs.

"Luxeon Rebel ES: Leading efficacy and light output, maximum design flexibility", Luxeon Rebel ES Datasheet DS61 20130221, www.philipslumileds.com, 2013, 33 pgs.

"Mobile Display Report", Insight Media, LLC, Apr. 2012, vol. 7, No. 4, 72 pgs.

"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.

"Optical measurements of retinal flow", Industrial Research Limited, Feb. 2012, 18 pgs.

"Osterhout Design Group Develops Next-Generation, Fully-integrated Smart Glasses Using Qualcomm Technologies", ODG, www.osterhoutgroup.com, Sep. 18, 2014, 2 pgs.

"Range Finding Using Pulse Lasers", OSRAM, Opto Semiconductors, Sep. 10, 2004, 7 pgs.

"Response time in Liquid-Crystal Variable Retarders", Meadowlark Optics, Inc., 2005, 4 pgs.

"Secondary Optics Design Considerations for SuperFlux LEDs", Lumileds, application brief AB20-5, Sep. 2002, 23 pgs.

"Solid-State Optical Mouse Sensor with Quadrature Outputs", IC Datasheet, UniqueICs, Jul. 15, 2004, 11 pgs.

"SVGA TransparentVLSITM Microdisplay Evaluation Kit", Radiant Images, Inc., Product Data Sheet, 2003, 3 pgs.

"Technical Data Sheet LPR1", Luminus Devices, Inc., Luminus Projection Chipset, Release 1, Preliminary, Revision B, Sep. 21, 2004, 9 pgs.

(56)        References Cited

OTHER PUBLICATIONS

"The Next Generation of TV", SID Information Display, Nov./Dec. 2014, vol. 30, No. 6, 56 pgs.

"Thermal Management Considerations for SuperFlux LEDs", Lumileds, application brief AB20-4, Sep. 2002, 14 pgs.

"UVTOP240", Roithner LaserTechnik GmbH, v 2.0, Jun. 24, 2013, 6 pgs.

"UVTOP310", Roithner LaserTechnik GmbH, v 2.0, Jun. 24, 2013, 6 pgs.

"Velodyne's HDL-64E: A High Definition Lidar Sensor for 3-D Applications", High Definition Lidar, white paper, Oct. 2007, 7 pgs.

"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.

"X-Cubes—Revisited for LCOS", BASID, RAF Electronics Corp. Rawson Optics, Inc., Oct. 24, 2002, 16 pgs.

Aachen, "Design of plastic optics for LED applications", Optics Colloquium 2009, Mar. 19, 2009, 30 pgs.

Abbate et al., "Characterization of LC-polymer composites for opto-electronic application", Proceedings of OPTOEL'03, Leganes-Madrid, Spain, Jul. 14-16, 2003, 4 pgs.

Al-Kalbani et al., "Ocular Microtremor laser speckle metrology", Proc. of SPIE, 2009, vol. 7176 717606-1, 12 pgs., doi:10.1117/12. 808855.

Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.

Amundson et al., "Morphology and electro-optic properties of polymer-dispersed liquid-crystal films", Physical Review E, Feb. 1997, vol. 55. No. 2, pp. 1646-1654.

An et al., "Speckle suppression in laser display using several partially coherent beams", Optics Express, Jan. 5, 2009, vol. 17, No. 1, pp. 92-103, first published Dec. 22, 2008.

Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.

Arnold et al., "52.3: An Improved Polarizing Beamsplitter LCOS Projection Display Based on Wire-Grid Polarizers", Society for Information Display, Jun. 2001, pp. 1282-1285.

Ayras et al., "Exit pupil expander with a large field of view based on diffractive optics", Journal of the Society for Information Display, May 18, 2009, vol. 17, No. 8, pp. 659-664, DOI: 10.1889/JSID17.8.659.

Baets et al., "Resonant-Cavity Light-Emitting Diodes: a review", Proceedings of SPIE, 2003, vol. 4996, pp. 74-86.

Bayer et al., "Introduction to Helmet-Mounted Displays", 2016, pp. 47-108.

Beckel et al., "Electro-optic properties of thiol-ene polymer stabilized ferroelectric liquid crystals", Liquid Crystals, vol. 30, No. 11, Nov. 2003, pp. 1343-1350, DOI: 10.1080/0267829031000160591 0.

Bergkvist, "Biospeckle-based Study of the Line Profile of Light Scattered in Strawberries", Master Thesis, Lund Reports on Atomic Physics, LRAP-220, Lund 1997, pp. 1-62.

Bernards et al., "Nanoscale porosity in polymer films: fabrication and therapeutic applications", Soft Matter, Jan. 1, 2010, vol. 6, No. 8, pp. 1621-1631, doi:10.1039/B922303G.

Bleha et al., "Binocular Holographic Waveguide Visor Display", SID Symposium Digest of Technical Papers, Holoeye Systems Inc., Jun. 2014, San Diego, CA, 4 pgs.

Bleha et al., "D-ILA Technology for High Resolution Projection Displays", Sep. 10, 2003, Proceedings, vol. 5080, 11 pgs., doi:10. 1117/12.497532.

Bone, "Design Obstacles for LCOS Displays in Projection Applications "Optics architectures for LCOS are still evolving"", Aurora Systems Inc., Bay Area SID Seminar, Mar. 27, 2001, 22 pgs.

Born et al., "Optics of Crystals", Principles of Optics 5th Edition 1975, pp. 705-707.

Bourzac, "Magic Leap Needs to Engineer a Miracle", Intelligent Machines, Jun. 11, 2015, 7 pgs.

Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.

Bowley et al., "Variable-wavelength switchable Bragg gratings formed in polymer-dispersed liquid crystals", Applied Physics Letters, Jul. 2, 2001, vol. 79, No. 1, pp. 9-11, DOI: 10.1063/1.1383566.

Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738, DOI: 10.1080/00222348.2013.808926.

Brown, "Waveguide Displays", Rockwell Collins, 2015, 11 pgs.

Bruzzone et al., "Compact, high-brightness LED illumination for projection systems", Journal of the Society for Information Display, vol. 17, No. 12, Dec. 2009, pp. 1043-1049, DOI: 10.1189/JSID17. 12.1043.

Buckley, "Colour holographic laser projection technology for heads-up and instrument cluster displays", Conference: Proc. SID Conference 14th Annual Symposium on Vehicle Displays, Jan. 2007, 5 pgs.

Buckley, "Pixtronix DMS technology for head-up displays", Pixtronix, Inc., Jan. 2011, 4 pgs.

Buckley et al., "Full colour holographic laser projector HUD", Light Blue Optics Ltd., Aug. 10, 2015, 5 pgs.

Buckley et al., "Rear-view virtual image displays", in Proc. SID Conference 16th Annual Symposium on Vehicle Displays, Jan. 2009, 5 pgs.

Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.

Bunning et al., "Electro-optical photonic crystals formed in H-PDLCs by thiol-ene photopolymerization", American Physical Society, Annual APS, Mar. 3-7, 2003, abstract #R1.135.

Bunning et al., "Holographic Polymer-Dispersed Liquid Crystals (H-PDLCs) 1", Annual Review of Material Science, 2000, vol. 30, pp. 83-115.

Bunning et al., "Morphology of Anisotropic Polymer Dispersed Liquid Crystals and the Effect of Monomer Functionality", Journal of Polymer Science: Part B: Polymer Physics, Jul. 30, 1997, vol. 35, pp. 2825-2833.

Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662, DOI: 10.1002/adma.200900298.

* cited by examiner

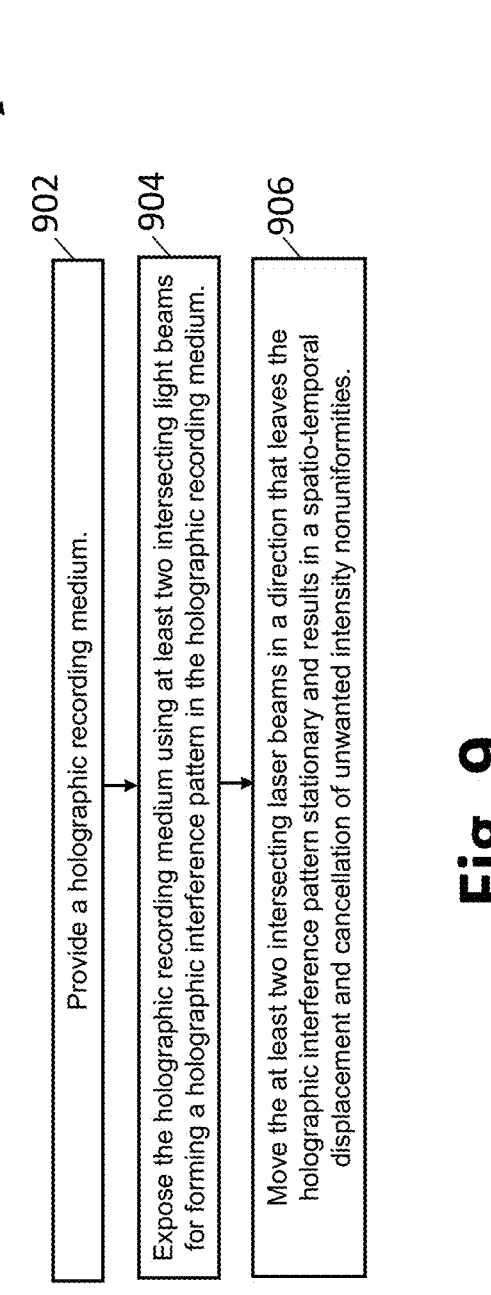

900

902
Provide a holographic recording medium.

904
Expose the holographic recording medium using at least two intersecting light beams for forming a holographic interference pattern in the holographic recording medium.

906
Move the at least two intersecting laser beams in a direction that leaves the holographic interference pattern stationary and results in a spatio-temporal displacement and cancellation of unwanted intensity nonuniformities.

Fig. 9

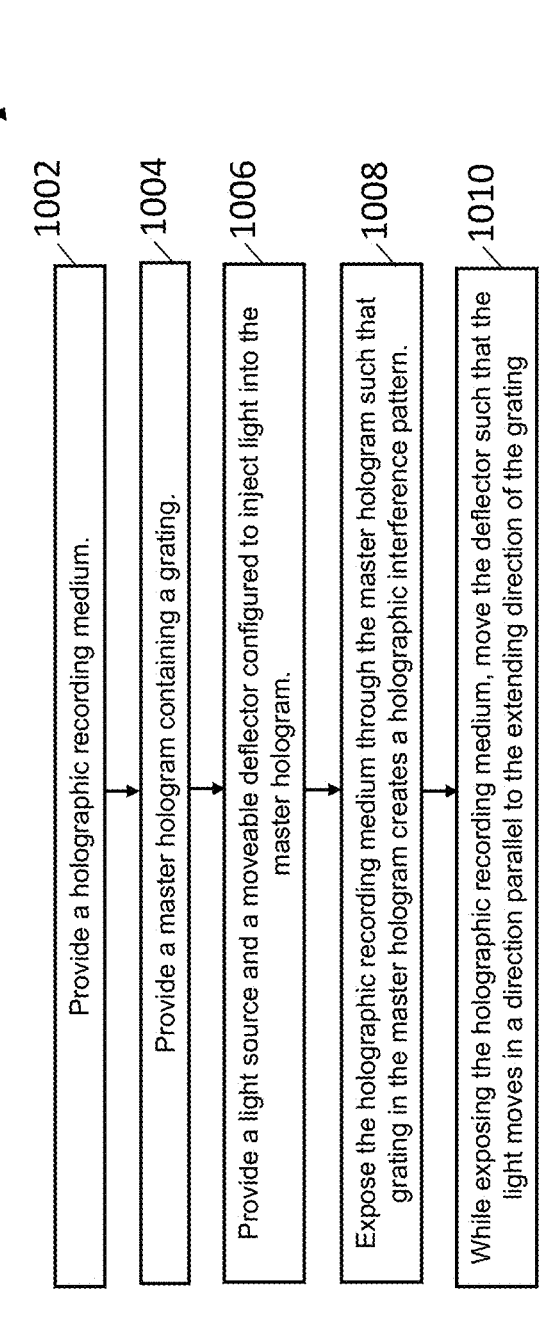

1002 — Provide a holographic recording medium.

1004 — Provide a master hologram containing a grating.

1006 — Provide a light source and a moveable deflector configured to inject light into the master hologram.

1008 — Expose the holographic recording medium through the master hologram such that grating in the master hologram creates a holographic interference pattern.

1010 — While exposing the holographic recording medium, move the deflector such that the light moves in a direction parallel to the extending direction of the grating

METHODS AND SYSTEMS FOR MINIMIZING HAZE DURING HOLOGRAPHIC RECORDING

CROSS-REFERENCE TO RELATED APPLICATIONS

This application claims the benefit of and priority under 35 U.S.C. § 119(e) to U.S. Provisional Patent Application No. 63/143,485 entitled " Method and System for Minimizing Haze During Holographic Recording," filed Jan. 29, 2021, which is incorporated herein by reference in its entirety for all purposes.

FIELD OF THE DISCLOSURE

The present invention generally relates to methods and systems for holographic recording.

BACKGROUND

Waveguides can be referred to as structures with the capability of confining and guiding waves (e.g., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection (TIR).

Fabrication of waveguides can include the use of material systems that allow for the recording of holographic optical elements within or on the surface of the waveguides. One class of such material includes polymer dispersed liquid crystal (PDLC) mixtures, which are mixtures containing photopolymerizable monomers and liquid crystals. A further subclass of such mixtures includes holographic polymer dispersed liquid crystal (HPDLC) mixtures. Holographic optical elements, such as volume phase gratings, can be recorded in such a liquid mixture by illuminating the material with two mutually coherent laser beams. During the recording process, the monomers polymerize, and the mixture undergoes a photopolymerization-induced phase separation, creating regions densely populated by liquid crystal (LC) micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for Augmented Reality (AR) and Virtual Reality (VR), compact Heads Up Displays (HUDs) for aviation and road transport, and sensors for biometric and laser radar (LIDAR) applications. As many of these applications are directed at consumer products, there is a growing requirement for efficient low cost means for manufacturing holographic waveguides in large volumes.

SUMMARY OF THE DISCLOSURE

Many embodiments are directed to methods and systems of minimizing haze during holographic recording.

Various embodiments include a holographic recording system including: a holographic recording medium; and a moveable light source configured to produce at least two intersecting light beams for forming a holographic interference pattern in the holographic recording medium. The moveable light source is configured to move the two intersecting light beams in a direction such that the holographic interference pattern remains stationary however there is spatio-temporal displacement and cancellation of unwanted intensity nonuniformities.

In various other embodiments, the moveable light source includes a grating configured to produce the at least two intersecting light beams.

In still various other embodiments, the moveable light source includes a stationary laser with a moveable deflector.

In still various other embodiments, said at least two intersecting light beams for forming a holographic interference pattern are configured as a scanned beam.

In still various other embodiments, the moveable light source or the holographic recording medium are configured to translate in a plane parallel to the holographic interference pattern while maintaining stationary exposure angles to perform a line-scan exposure.

In still various other embodiments, the moveable light source is configured to perform a flood exposure or a selective exposure of the holographic recording medium.

Various embodiments further include a holographic recording system including: a holographic recording medium; a master hologram containing a grating; and a light source and moveable deflector configured to diffract light through the master hologram into the holographic medium to form a holographic interference pattern. The moveable deflector is configured to move in a direction parallel to the extending direction of the grating.

In various other embodiments, the direction is parallel to fringes within the holographic interference pattern.

In still various other embodiments, the moveable deflector comprises a mirror or a lens.

In still various other embodiments, the light source comprises a laser.

In still various other embodiments, the moveable deflector is configured to vary least one beam deflection characteristic over the exposure time selected from the group consisting of speed, acceleration, direction, and amplitude.

In still various other embodiments, the moveable deflector is moveable in a pattern including a regular waveform or a random waveform.

In still various other embodiments, the moveable deflector is further configured to move along fringes within the holographic interference pattern with magnitude less than or equal to 2 degrees.

In still various other embodiments, the holographic recording material is selected from a group consisting of a holographic photopolymer, a mixture of liquid crystal (LC) and monomer and a mixture of nanoparticles and monomer.

In still various other embodiments, the beam deflector is configured to tune a grating formation process by varying at least one beam deflection characteristic selected from the group consisting of speed, acceleration, direction, and amplitude.

Various embodiments further include a method for producing a holographic grating, the method including: providing a holographic recording medium; exposing the holographic recording medium with a moveable light source configured to produce at least two intersecting laser beams for forming a holographic interference pattern in the holographic recording medium; moving the at least two intersecting laser beams in a direction that leaves the holographic interference pattern stationary and results in a spatio-temporal displacement and cancellation of unwanted intensity nonuniformities.

In various other embodiments, the moveable light source includes a grating configured to produce the at least two intersecting light beams.

In still various other embodiments, the moveable light source includes a stationary laser with a moveable deflector.

In still various other embodiments, said at least two intersecting light beams for forming a holographic interference pattern are configured as a scanned beam.

In still various other embodiments, the method further includes translating the moveable light source or the holographic recording medium in a plane parallel to the holographic interference pattern while maintaining stationary exposure angles to perform a line-scan exposure.

In still various other embodiments, exposing the holographic recording medium includes a flood exposure or a selective exposure of the holographic recording medium.

Various embodiments further include a method for producing a holographic grating, the method including: providing a holographic recording medium; providing a master hologram containing a grating; exposing the holographic recording medium with a light source and moveable deflector configured to diffract light through the master hologram and into the holographic medium to form a holographic interference pattern; and moving the moveable deflector in a direction parallel to the extending direction of the grating.

In various other embodiments, the direction is parallel to fringes within the holographic interference pattern.

In still various other embodiments, the moveable deflector includes a mirror or a lens.

In still various other embodiments, the light source includes a laser.

In still various other embodiments, moving the moveable deflector includes varying at least one beam deflection characteristic over an exposure time selected from the group consisting of speed, acceleration, direction, and amplitude.

In still various other embodiments, the moveable deflector is moveable in a pattern including a regular waveform or a random waveform.

In still various other embodiments, moving the moveable deflector includes moving along fringes within the holographic interference pattern with magnitude less than or equal to 2 degrees.

In still various other embodiments, the holographic recording material is selected from a group consisting of a holographic photopolymer, a mixture of liquid crystal (LC) and monomer and a mixture of nanoparticles and monomer.

In still various other embodiments, moving the beam deflector includes tuning to stages in a grating formation process at least one beam deflection characteristic over an exposure time selected from the group consisting of speed, acceleration, direction, and amplitude.

Various embodiments further include a holographic line scan exposure system including: a holographic recording medium; a moveable light source configured to produce at least two intersecting light beams for forming a holographic interference pattern in the holographic recording medium, the holographic interference pattern having an extending direction; and an optical element for providing an exposure beam convergence or divergence in a plane both containing the extending direction and substantially orthogonal to the surface of the holographic recording medium. The moveable light source or the holographic recording medium are configured to translate in a plane parallel to the extending direction while maintaining stationary exposure angles such that the holographic interference pattern remains stationary. The combination of the exposure beam convergence or divergence by the optical element and the translation of the movable light source or the holographic recording medium provide spatio-temporal displacement and cancellation of unwanted intensity nonuniformities.

In various other embodiments, the holographic recording medium is applied to a curved substrate.

In still various other embodiments, the optical element includes at least one cylindrical surface.

In still various other embodiments, the optical element includes at least one freeform surface.

In still various other embodiments, the intersecting light beam directions produced by the movable light source lie in a plane substantially orthogonal to the plane within which the beam convergence or divergence by the optical element takes place.

In still various other embodiments, deviations from orthogonality between the plane containing the intersecting light beam directions produced by the movable light source and the plane within which the beam convergence or divergence by the optical element takes place are less than 2 degrees.

In still various other embodiments, the holographic interference pattern includes fringes curved in at least one dimension and wherein the extending direction is along a tangent to at least a portion of the fringes.

In still various other embodiments, deviations from orthogonality between the plane within which beam convergence or divergence by the optical element takes place and the surface of the holographic recording medium are less than 2 degrees.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 9 is a method for reducing haze during the recording of a hologram in accordance with an embodiment of the invention.

FIG. 10 is a method for reducing haze during the recording of a hologram in accordance with an embodiment of the invention.

DETAILED DESCRIPTION

Figure 1:
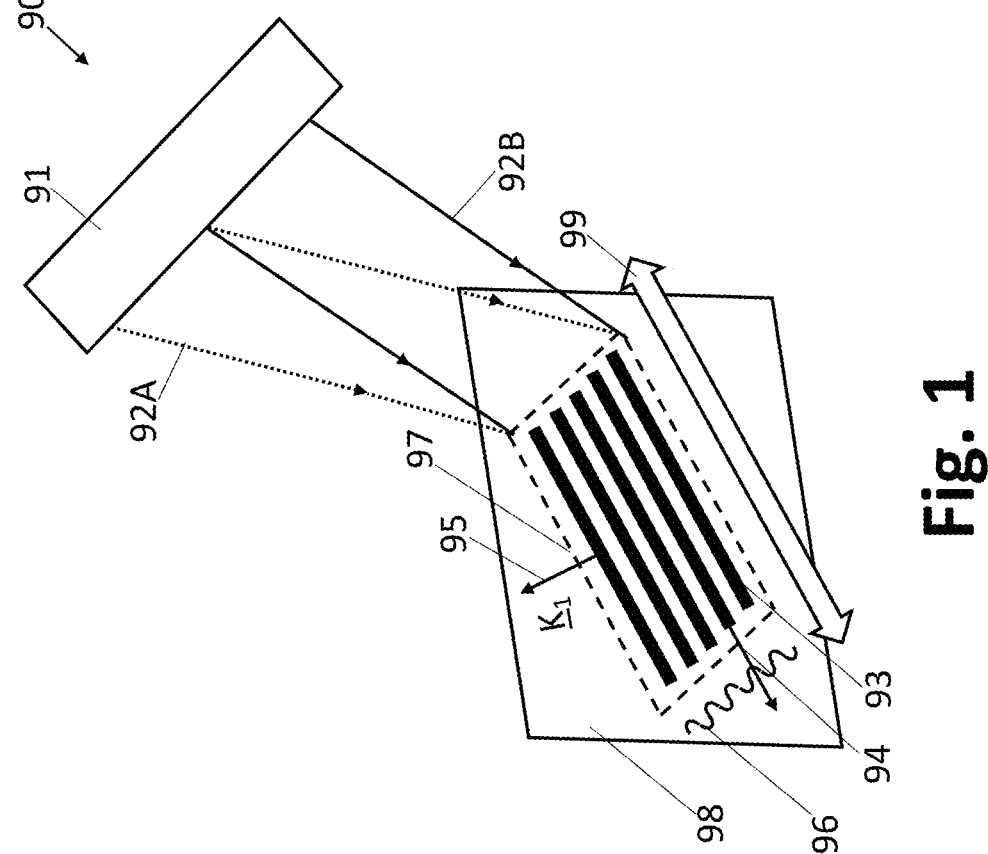
FIG. 1 illustrates an example embodiment of a holographic exposure system in accordance with an embodiment of the invention.

There is a growing interest in the use of various gratings on waveguides in order to provide a variety of functions. These gratings include angle multiplexed gratings, color multiplexed gratings, fold gratings, dual interaction gratings, rolled K-vector gratings, crossed fold gratings, tessellated gratings, chirped gratings, gratings with spatially varying refractive index modulation, gratings having spatially varying grating thickness, gratings having spatially varying average refractive index, gratings with spatially varying refractive index modulation tensors, and gratings having spatially varying average refractive index tensors. In specific examples, gratings for diffraction of various polarizations of light (e.g. S-polarized light and P-polarized light) may be beneficial.

Holographic gratings are a particular class of gratings that may be useful for waveguide displays. Holographic gratings are recorded in holographic photopolymers which may include mixtures of monomer and LC or mixtures of monomer and nanoparticles. It has been observed that haze and stray light are problematic in holographic gratings. In some cases, haze can result from parasitic gratings, formed by stray light in the recording apparatus, contamination of optical surfaces in the recording beam optical paths, recording beam nonuniformities, and diffraction by unused reactants. In some cases, haze can result from unused reactants from polymerization and phase separation processes, which form scattering centers in the finished grating. Scatter from optical surfaces in the exposure beam paths can also contribute. While haze is statistical in nature, stray light arising from unwanted beam paths, higher diffraction orders and other sources can lead to larger scale illumination nonuniformities, often appearing as fixed pattern noise (e.g. banding). More efficient chemistry and careful optical design of optical exposure systems can significantly reduce haze. However, with growing demand for high contrast imaging, it may be advantageous to have more effective techniques for minimizing haze during recording.

Haze can be reduced by averaging scattered wavefronts. One example is a holographic recording system using a rotatable wedge for de-correlating scatter during exposure (A. Y. Tikhomirov and T. J. McKay, "Design of low-haze holographic notch filters", Applied Optics, Vol. 38, No. 21, 20 Jul. 1999). While such solutions may be satisfactory for filters, they may result in trade-offs between haze reduction and diffraction efficiency when applied to the more complex gratings used in waveguide displays.

The disclosed embodiments include a method for reducing haze during holographic recording that is scalable over the range of holographic applications. These methods may be inexpensive to implement and may not degrade the diffraction efficiency of the finished holographic grating. Further disclosed are embodiments of a system which implements the method described. The method for reducing haze may further be applied to a range of recording materials, including holographic photopolymers, mixtures of monomer and LC, or mixtures of monomer and nanoparticles.

Turning to the figures, many embodiments of the disclosure pertain to holographic exposure systems and methods for suppressing holographic haze while maintaining high grating quality. In some embodiments, high grating quality may include high fringe contrast which results in high diffraction efficiency.

FIG. 1 illustrates an example embodiment of a holographic exposure system 90 in accordance with an embodiment of the invention. This holographic exposure system 90 includes crossed recording beams 92A,92B coming from two different directions (e.g. at two specific recording angles) into a holographic recording medium 98. While specific directions are illustrated, other different directions are contemplated. The recording beams 92A,92B interfere within the holographic recording medium 98 creating a holographic interference pattern 93. The holographic interference pattern 93 includes a fringe vector 94, a K-vector 95, and an index modulation 96 and is formed in a region 97 of the holographic recording substrate 98. In many cases, there may be defects in portions of the recording beams 92A,92B which may create many localized defects in certain exposed portions. These localized defects (e.g. haze) may be cause by abnormalities in the intensity of the recording beam 92A, 92B or defects in the components of the system (e.g. dirt or dust on beam forming components). Exposing the holographic recording medium 98 to recording beams 92A,92B that contain defects may cause increased haze. It has been discovered that moving (e.g. dithering or wobbling) the holographic recording beams in a direction that maintains the specific recording angles exposes the same portion of the holographic recording medium 98 to light at the same recording angle but does not include defects. Thus, the recording beams 92A,92B may be angularly displaced in a direction 99 substantially parallel to the fringe vector 94 of the holographic interference pattern 93 which may decrease defects.

Put in other terms, moving the holographic recording beams 92A,92B in a direction that maintains the same recording angles minimizes the amount of haze by cancelling the wavefront defects of the light beams used for exposing a specific portion of the holographic recording medium 98. In many embodiments, the holographic exposure system may include a laser source, a master hologram, and a moveable beam deflector such as motorized mirror. The function of the moveable beam deflector is to apply a beam deflection which may be moved in the direction of the extending direction of a grating within the master hologram. The beam deflections may be clocked along the exposure fringes of the grating within the master hologram. The beam deflections may be small angular shifts which may result in small angular shifts of the recording beam which may result in spatio-temporal averaging-out of scattered light that would otherwise contribute haze to the recorded holograms. The scattered light may be caused by defects in the system, such as defects in the moveable beam deflector or the master hologram. Deflecting the beam in this manner does not change the K-vector (or, equivalently, the slant angle) of the resulting holographic interference pattern. The K-vector may also be referred to as the grating vector. The K-vector may be the vector normal to the fringe planes of a grating. In the case of a linear extending grating, a single K-vector characterizes the entire grating. In the case of a grating with curved fringes, the local K-vector varies across the grating. Consequently, there is no significant displacement of the fringe pattern by deflecting the beam in a direction parallel to the extending direction of the grating within the master hologram. It has been demonstrated that angular deflections substantially clocked along the exposure fringes (grating fringes) with offset angle magnitudes as high as 2 degrees relative to the extending direction show no significant impact on the grating fringes (and the diffraction efficiency of the grating). The offset angles may arise from curvature of the fringes or from misalignments of the exposure apparatus. In contrast, clocking at an angle significantly different from the extending direction of the grating fringes (e.g. an angle perpendicular to the grating fringes or parallel to the K-vector) results in displacement of the fringe patterns which may result in unwanted changes in the fringe patterns which may decrease diffraction efficiency.

In some embodiments, the recording beams 92A,92B may be formed by a master hologram or a two-beam holographic exposure system. The recording beams 92A,92B may be a flood exposure or line scan configuration in order to expose a large surface area holographic recording medium. Although a parallel linear fringe pattern portion formed on a flat substrate is illustrated in FIG. 1, FIGS. 11-13 describe techniques using curved fringe patterns or curved substrates. Using X-Y stepping and beam rotation, beam deflections may be applied in any direction at any spatial location for recording fringe patterns of any spatial prescription on substrates of any curvature, as long as the hologram is spatially quantized such that at any location the beam displacements are substantially parallel to the fringe vector. Various deflections of the recording beams 92A,92B in direction 99 have been contemplated including various amplitude vs time characteristics.

While the following description discusses embodiments using recording beam deflections clocked along the exposure fringes, it should be noted that embodiments of the invention apply generally to any clocking/movement that leaves the grating fringes stationary and results in a spatio-temporal movement of unwanted defects in the beam (e.g. intensity variations; beam defects cause by defects in the beam forming components). In some embodiments, the moveable beam deflector may be a motorized optical element for steering a laser beam.

In some embodiments, the holographic recording medium 98 may be formed on a substrate with a deposition or printing technique such as an ink-jet printing technique. Examples of ink-jet printing techniques are discussed in U.S. Pat. App. Pub. No. 2019/0212588 entitled "Systems and Methods for Manufacturing Waveguide Cells" which is hereby incorporated by reference in its entirety.

Figure 2A:
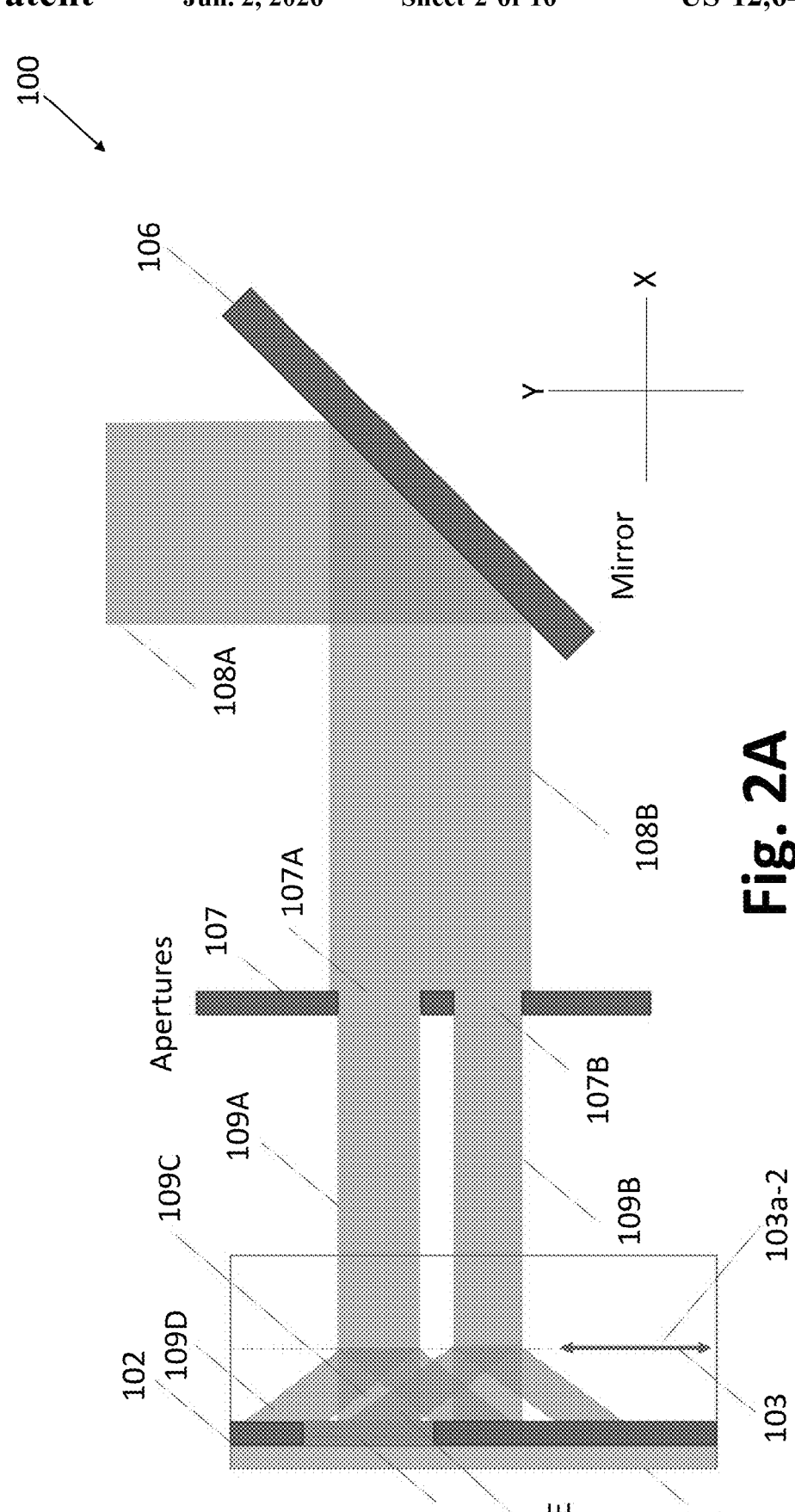
FIG. 2A conceptually illustrates a side view of a holographic exposure system in accordance with an embodiment of the invention.

FIG. 2A conceptually illustrates a side view of a holographic exposure system 100 in accordance with an embodiment of the invention. The system 100 includes a holographic mastering stack comprising a holographic recording medium 102 and a master grating 103 configured to record a hologram 104 in the holographic recording medium 102. A substrate 105 supports the holographic recording medium 102. A movable mirror 106 may be mounted on a motorized drive and a mask substrate 107 containing at least two apertures 107A,107B may be disposed between the movable mirror 106 and the mastering stack. In many embodiments, the moveable mirror 106 has a planar surface. In some embodiments, the mirror can be curved. The mirror deflects an incident collimated laser beam 108A into a beam incident on the mask substrate 107. The at least two apertures 107A,107B create parallel beams 109A,109B including a first incident beam 109A and a second incident beam 109B which propagate onto the master grating 103. The master grating 103 converts each of the incident beams 109A,109B into 0-order, +1-order, and −1-order diffracted beams. The 0-order beam 109C from the first incident beam 109A and the first order beam 109E from the adjacent incident beam 109B interfere in the holographic recording medium 102 to form the hologram 104 in the holographic recording medium 102. The other 0-order and diffracted beams can be trapped or used to record other gratings within the holographic recording medium 102. The master grating 103 includes gratings 103a which have a K-vector 103a-2 which is perpendicular to an extending direction 103a-1 (shown in FIG. 2B) of the gratings 103a.

Figure 2B:
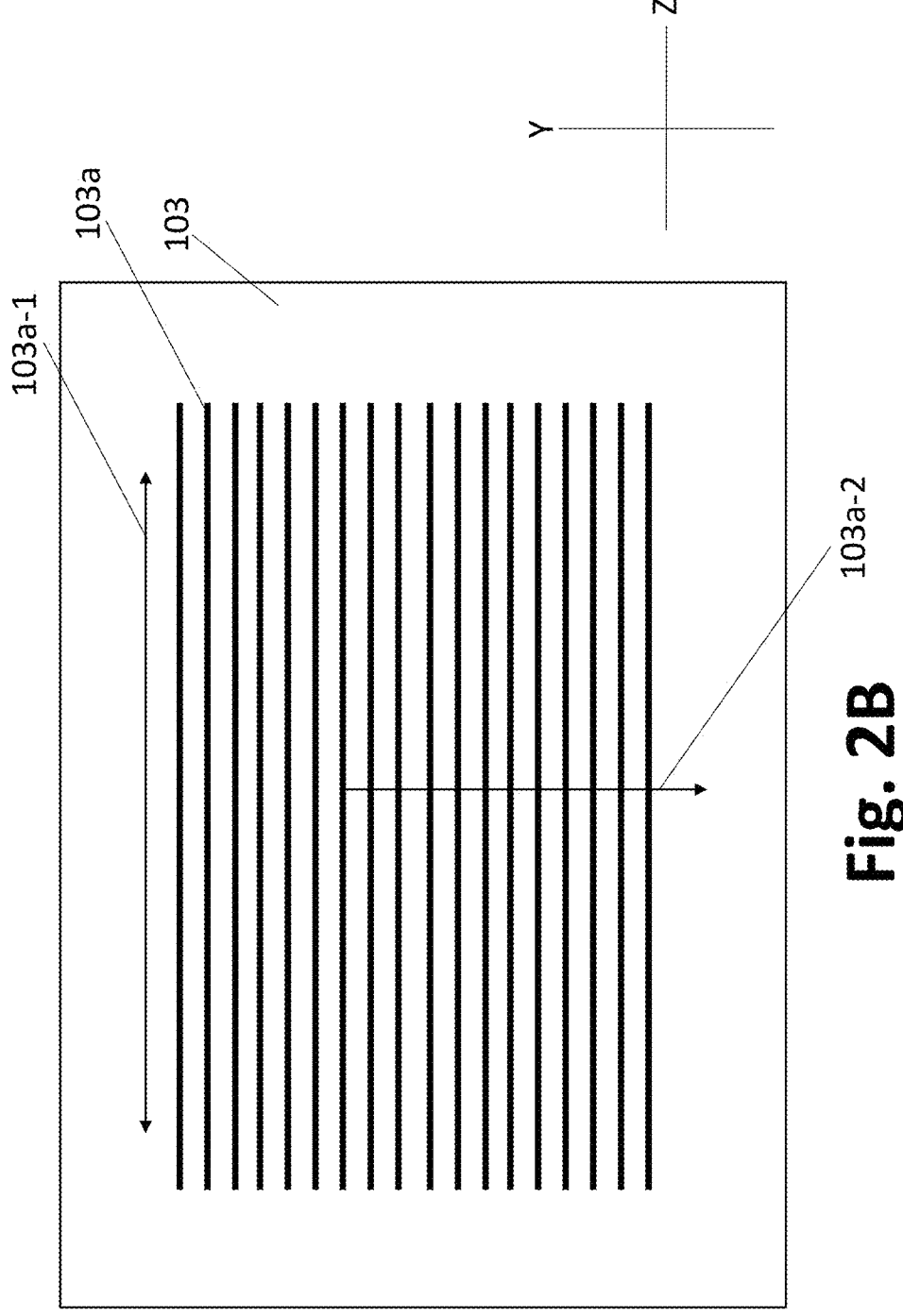
FIG. 2B illustrates a top view of an example master grating described in connection with FIG. 2A.

FIG. 2B illustrates a top view of an example master grating 103 described in connection with FIG. 2A. The master grating 103 includes grating diffractive elements 103a (e.g. fringes) which have an extending direction 103a-1. The grating elements 103a include a K-vector 103a-2 which is perpendicular to the extending direction 103a-1.

Figure 2C:
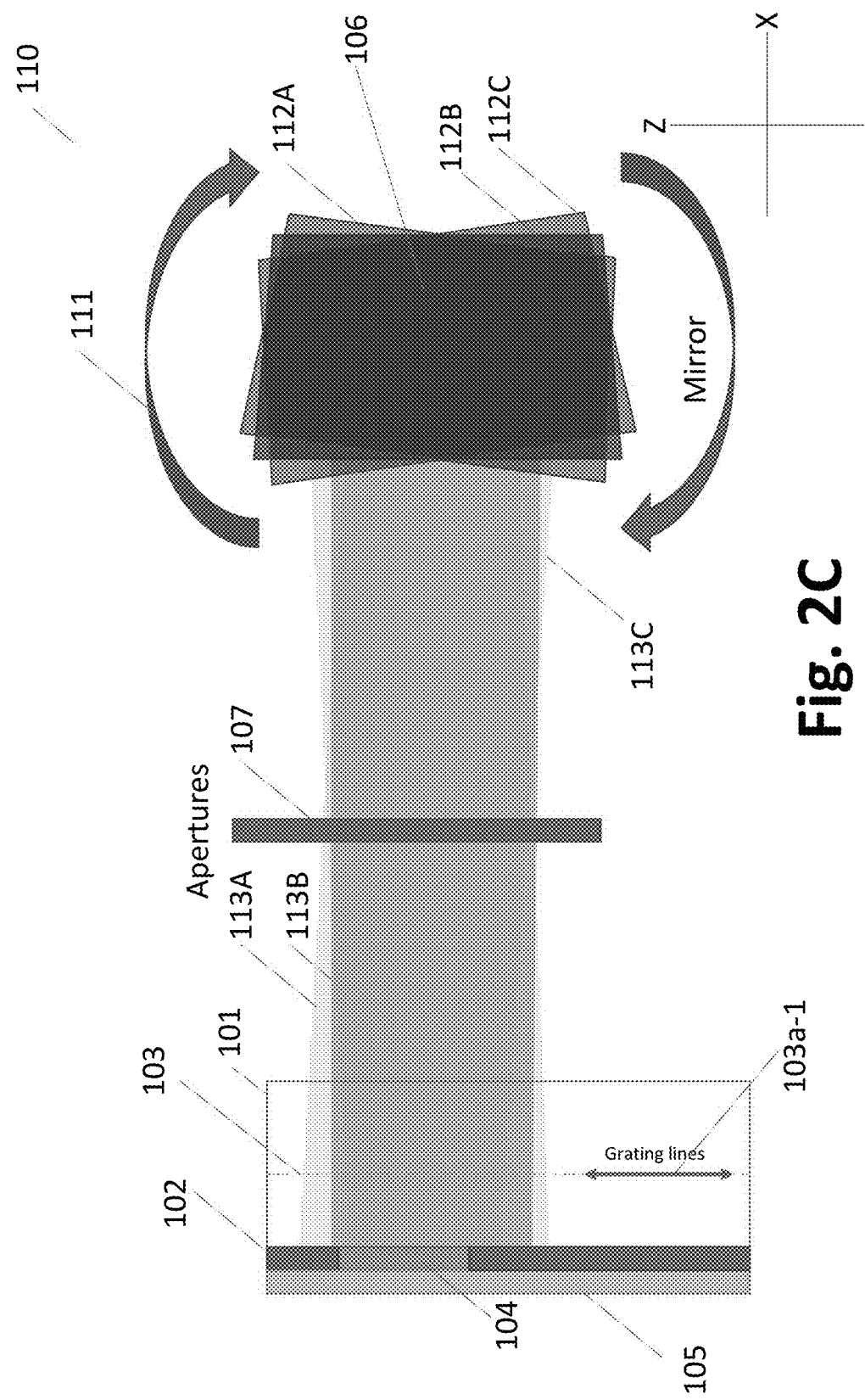
FIG. 2C conceptually illustrates another side view of the holographic exposure system of FIG. 2A showing the deflection of the recording beam.

FIG. 2C conceptually illustrates another side view of the holographic exposure system of FIG. 2A showing the deflection of the recording beam. Small angular deflections 111 (which are in the plane of the drawing) are applied to the mirror 106 which results in successive mirror rotational positions 112A-112C. The successive mirror rotational positions 112A-112C result in the beam rotating in various positions 113A-113C, respectively. As illustrated, the small angular deflections 111 are in a direction parallel to the extending direction 103a-1 of the gratings 103a. Advantageously, the recording angles for the beams 109A,109B will not be disturbed in all positions 113A-113C while there is spatio-temporal averaging-out of scattered light that would otherwise contribute haze to the recorded hologram 104.

While FIGS. 2A-2C illustrate one implementation of the holographic exposure system, other embodiments are as well contemplated. For example, the one or more apertures 107A-107B may be more than two mask apertures which may be used to simultaneous record of more than one hologram. In some embodiments the holographic exposure system may include collimation optics, a means for trapping stray reflections, devices for compensating vibrations and component alignment drift, and other components used in holographic exposure.

Figure 3A:
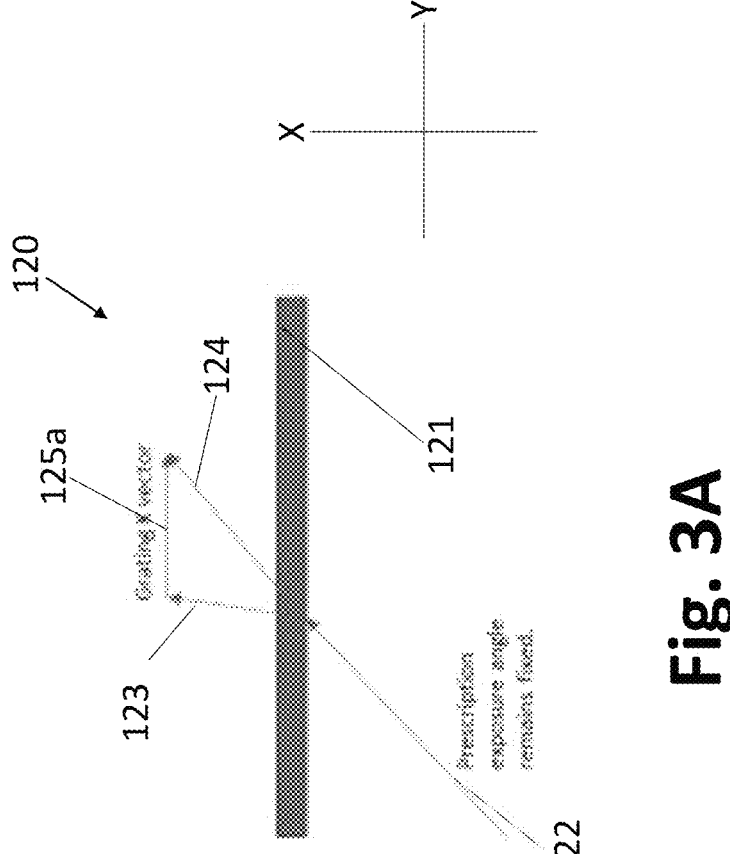
FIG. 3A is a side view of a holographic recording system in accordance with an embodiment of the invention.

FIG. 3A is a side view of a holographic recording system 120 in accordance with an embodiment of the invention. The holographic recording system 120 includes a master grating 121, an incident ray 122 of recording light, a diffracted ray 123 of the incident ray 122, and a 0-order ray 124 which is undiffracted light and a grating K-vector 125*a*. The grating fringes of the master grating 121 include extending directions which are perpendicular to the plane of the drawing and perpendicular to the grating K-vector 125*a*.

Figure 3B:
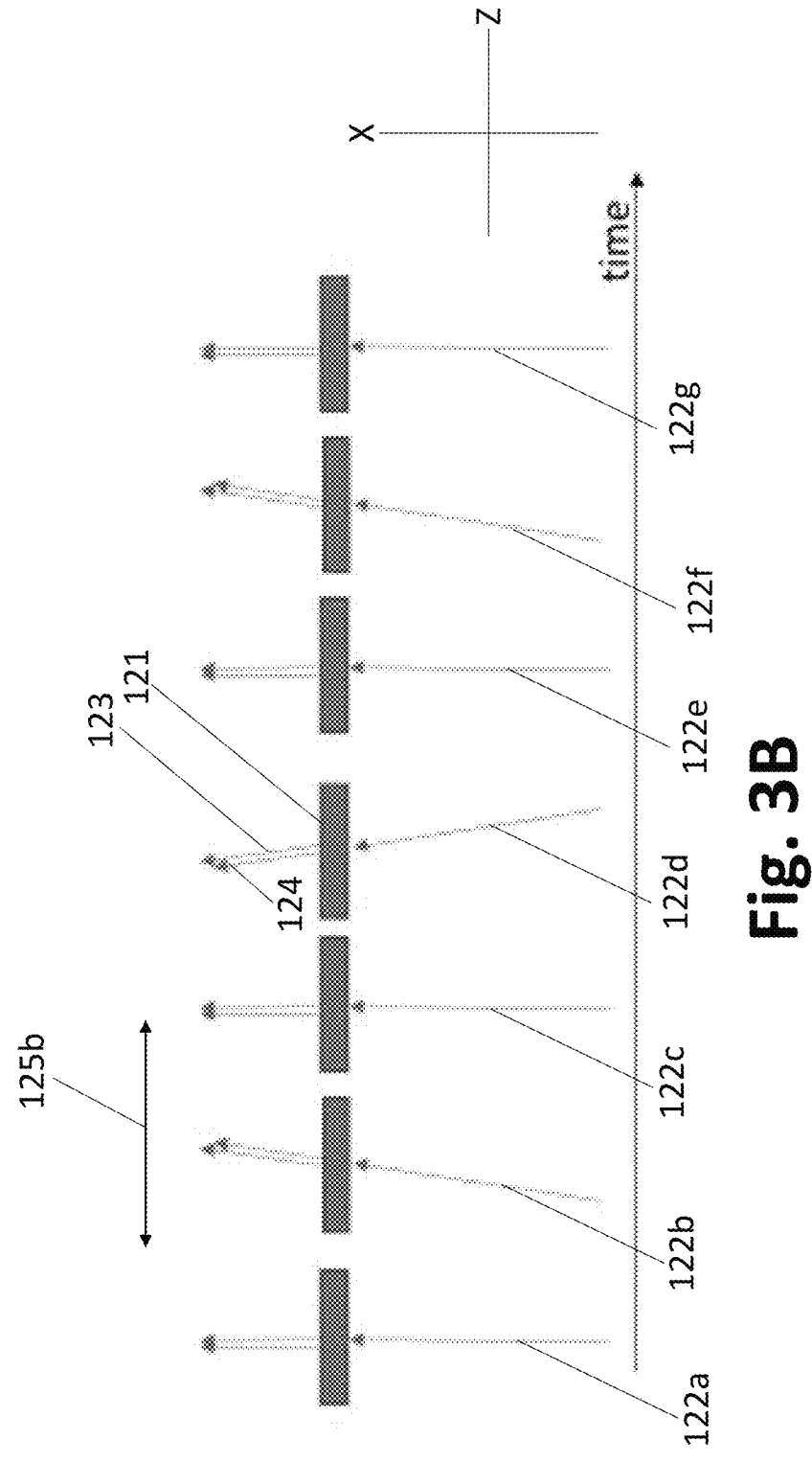
FIG. 3B is another side view of the recording configuration of FIG. 3A.

FIG. 3B is another side view of the recording configuration of FIG. 3A showing the direction of the incident ray 122 incident on a portion of the master grating 121 indicating, the directions of incident rays 122 which diffracts to form a diffracted rays 123 and a 0-order ray 124 (labelled by numerals 132,133,134, respectively) at different times during the exposure process. The grating fringes of the master grating 121 have an extending direction 125*b* parallel to the plane of the drawing. As illustrated, the incident ray 122 dithers in various positions 122*a*-122*g* in a direction parallel to the extending direction 125*b*. The incident ray 122 diffracts into a diffracted ray 123 and 0-order ray 124 of varied direction based on the direction of the incident ray 122.

As illustrated in FIG. 3B, the diffracted rays 123 and 0-order ray 124 vary as the direction of the incident ray 122 various in position 122*a*-122*g* in the extending direction 125*b* of the grating fringes of the master grating 121. Whereas, as illustrated in FIG. 3A, the position of the incident ray 122 stays constant in the K-vector direction 125*a* of the grating fringes of the master grating 121 which keeps the direction of the diffracted ray 123 and 0-order ray 124 constant in the K-vector direction 125*a*.

In some embodiments, the moveable mirror 106 may be connected to a motorized mirror drive. The motorized mirror drive may be a Thorlabs ZF S06 two-phase stepper motor made by Thorlabs, Inc. The specifications of the drive may include:

backlash: <15 micron;
    bidirectional repeatability: <5.0 micron;
    home location accuracy: <5.0 micron;
    maximum load capacity 40N;
    maximum velocity: 2.0 mm/s; and
    maximum acceleration: 10 mm/s2.

The ZF S06 motor drive can provide 49,152 micro steps per revolution with a minimum incremental motion of approximately 0.5 nm. The ZF S06 motor typically has a travel of 6 mm. To extend the range of mirror mounts on which the motor can be mounted the travel range may be around 25 mm. Other motor drives are contemplated for moving the moveable mirror 106.

Advantageously, the motorized mirror may be configured to operate with a range of dynamic characteristics. In many embodiments, the motorized mirror dynamic characteristic may be one or more of speed, acceleration, direction, or amplitude of the beam deflections which may be varied during exposure. In various embodiments, the mirror displacement can be driven by a regular waveform or a random waveform. In some embodiments, the waveform of the mirror displacement may vary linearly or sinusoidally. In some embodiments, the power density (mW/cm²) of the exposure systems can be varied in conjunction with one or more of the above mirror dynamic characteristics to balance haze reduction and diffraction efficiency.

Figures 4A, 4B:
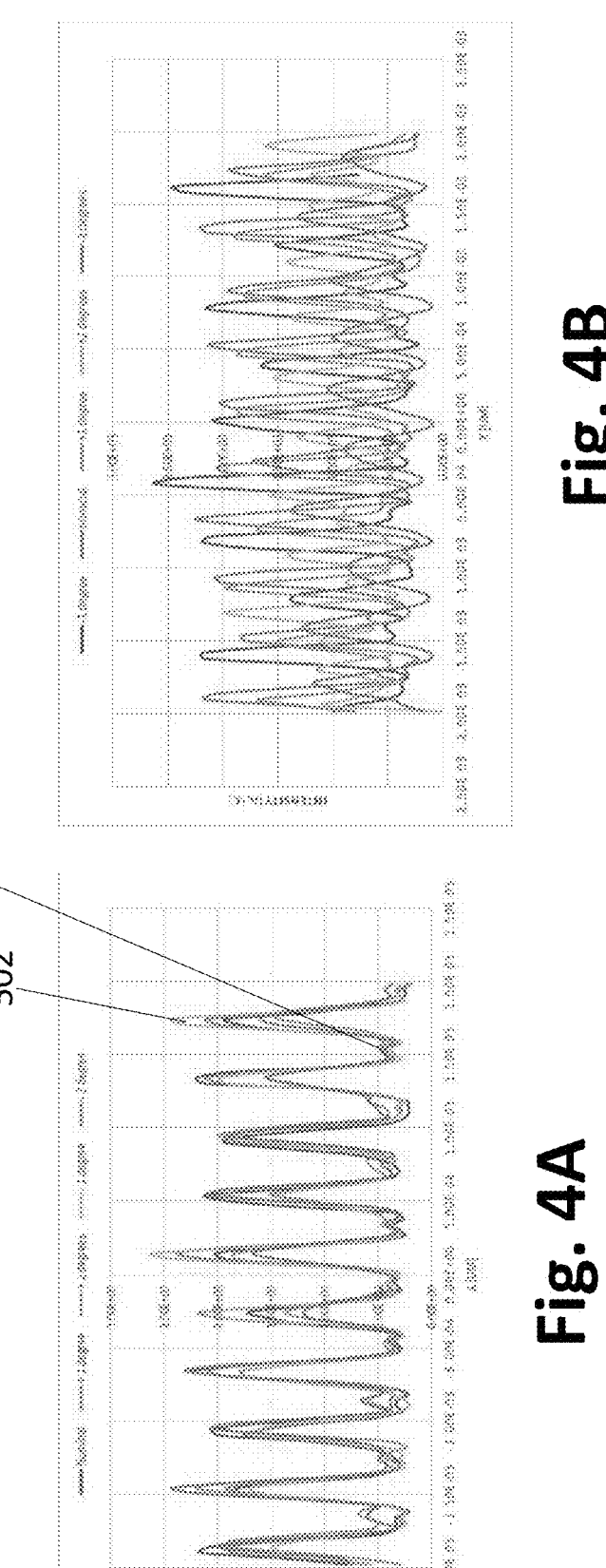
FIG. 4A is various graphs of exposure fringe intensity vs. distance along the grating in a direction parallel to the grating K-vector and perpendicular to the extending direction of the gratings.
FIG. 4B is various graphs of exposure fringe intensity versus distance in a direction parallel to the grating K-vector and perpendicular to the extending direction of the gratings.

FIG. 4A is various graphs of exposure fringe intensity vs. distance along the grating in a direction parallel to the grating K-vector and perpendicular to the extending direction of the gratings. The various graphs each depict a different deflected recording beam with the recording beam deflected in a direction parallel to the extending direction of the gratings from an angle of +2° to −2°. Ideally, the grating pattern, which includes periods of high intensity 502 followed by periods of low intensity 504, occurs here from a deflection angle of +2° to −2°.

In comparison, FIG. 4B is various graphs of exposure fringe intensity versus distance in a direction parallel to the grating K-vector and perpendicular to the extending direction of the gratings. The various graphs each depict a different deflected recording beam with the recording beam deflected in a direction parallel to the grating K-vector and perpendicular to the extending direction of the grating from an angle of +2° to −2°. As illustrated, this pattern does not include periods of high intensity followed by periods of low intensity as illustrated in FIG. 4A since deflecting the recording beam in a direction which is not parallel to the extending direction of the gratings changes the recording angle which distorts the resultant grating. The holographic grating created based upon this method would have poor diffraction efficiency.

Figure 5B:
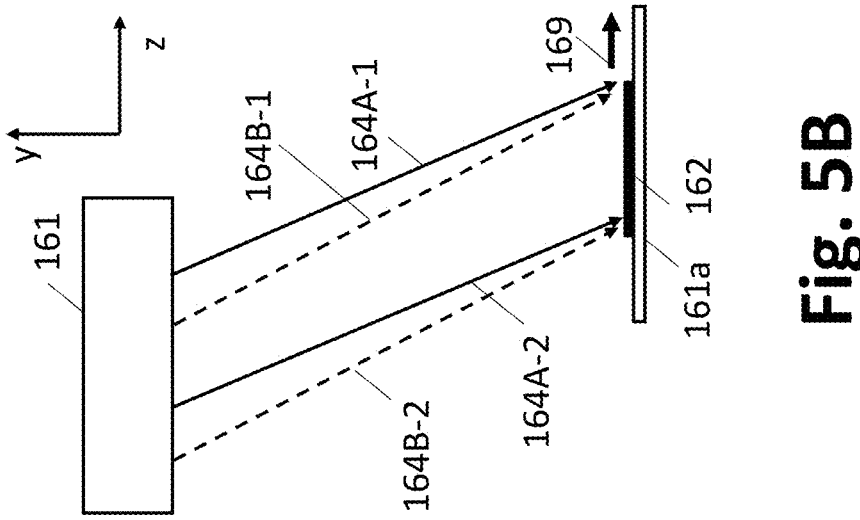
FIG. 5B shows a section of the line scanned holographic exposure system of FIG. 5A.
Figure 5A:
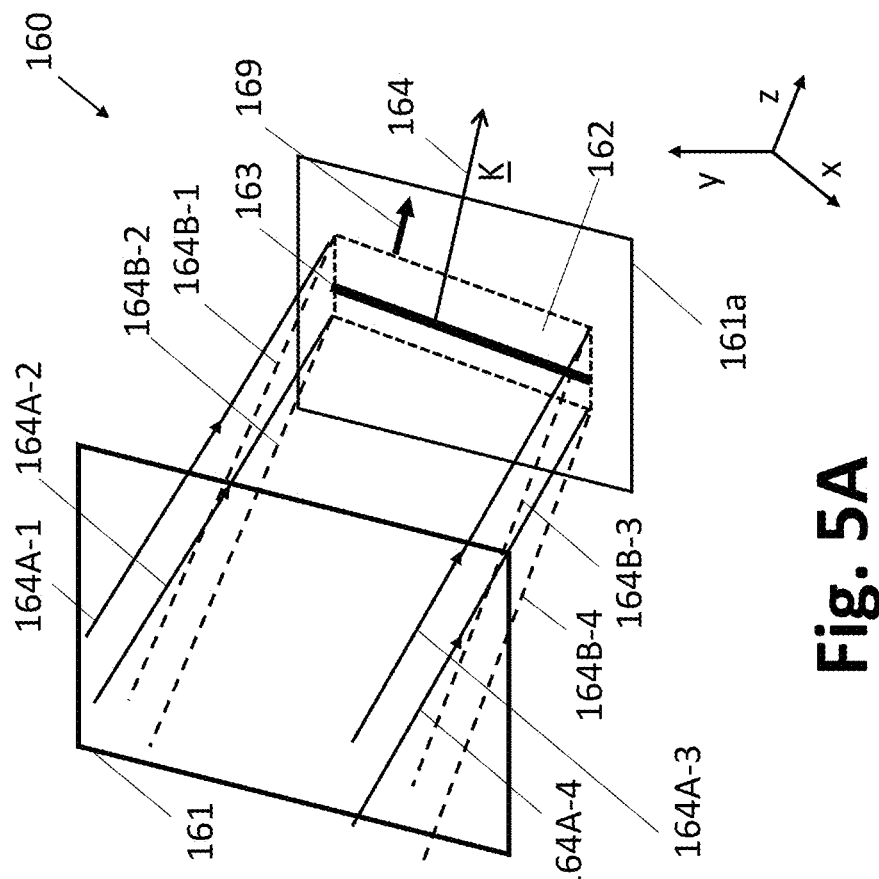
FIG. 5A conceptually illustrates a perspective view of a recording configuration using a line scanned holographic exposure system in accordance with an embodiment of the invention.

FIG. 5A conceptually illustrates a perspective view of a recording configuration using a line scanned holographic exposure system 160 in accordance with an embodiment of the invention. The exposure system 160 includes a master grating 161 for recording a grating on the holographic recording layer 161*a*. During recording, the master grating 161 forms an elongate illumination patch 162 containing interference fringes 163 extending in a direction normal to the grating K-vector 164. The interference fringes 163 are formed by the interference of a first output beam and a second output beam which form two elongate cross section output beams from the master grating 161. The boundary rays of the elongate cross section output beam are represented by a first output beam from the master grating 161 having the extremity rays 164A-1,164A-2,164A-3,164A-4 and a second output beam from the master grating 161 having the extremity rays 164B-1,164B-2,164B-3,164B-4. The first output beam and the second beam interfere to form interference fringes 163 with the grating K-vector 164.

The recording input beam to the master grating 161 may be provided using a collimated laser beam 108A and a moveable deflector 106 as described in connection with FIGS. 2A-2C. In many embodiments, beam shaping components such as cylindrical lenses or anamorphic lenses may be used to facilitate the formation of the elongate output beam used to form the elongate illumination patch 162. In many embodiments, the beam shaping components may be disposed between the collimated laser beam 108A and the moveable deflector 106. In some embodiments, a more compact arrangement may be provided by combining the beam shaping components with the movable deflector 106 in a single optical assembly. In some embodiments, the beam shaping components may be located between the movable deflector 106 and the master grating 161. However, such arrangements may be more prone to misalignment. In some embodiments, it may be possible to eliminate the need for beam shaping components by using a mask containing an elongate apertures. However, elongate apertures may result in unacceptable loss of light.

FIG. 5B shows a section of the line scanned holographic exposure system 160 of FIG. 5A orthogonal to both the plane of the elongated extending direction of the illumination patch 162 and the extending direction of the interference fringes 163. The first output beam is depicted by the extremity rays 164A-1,164A-2 from the grating master 161 and the second output beam is depicted by the extremity rays 164B-1,164B-2 from the grating master 161. The extending direction of the interference fringes 163 is perpendicular to the drawing plane of FIG. 5B. As shown in FIG. 5B, the beam cross section of each of the first output beam and the second output beam are collimated (e.g. the rays are parallel to one another). In some embodiments, the beam cross section of each of the first output beam and the second output beam may be divergent or convergent (e.g. the beams may not be parallel). In some embodiments, the beam cross sections of each of the first output beam and the second output beam may include a small divergence or convergence if the grating to be recorded is curved to provide optical power.

Figure 5C:
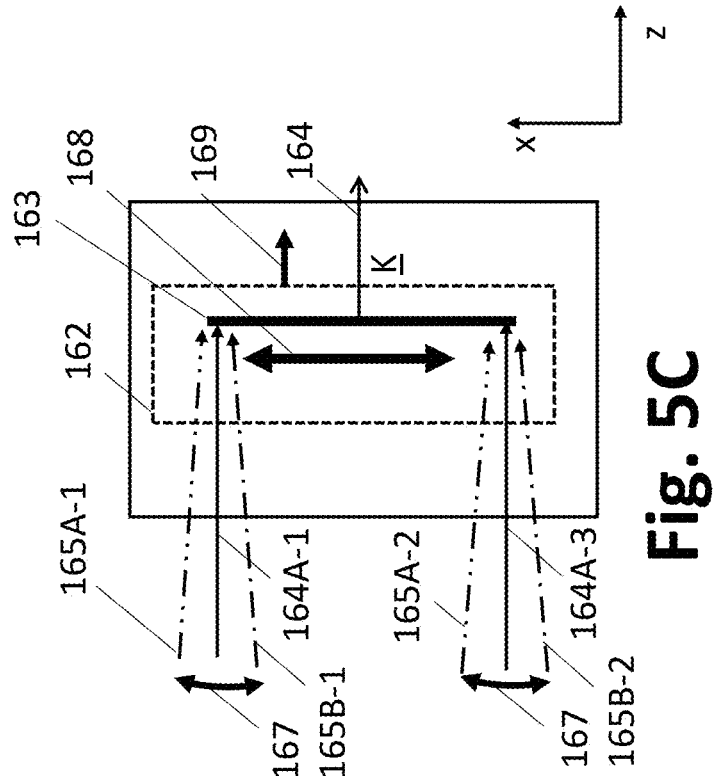
FIG. 5C shows a plan view of the holographic recording layer and the illumination patch.

FIG. 5C shows a plan view of the holographic recording layer and the illumination patch. The coplanar extremity rays 164A-1,164A-3 of the first output beam are overlaid. As described previously, the light beam direction may be diverted using a moveable deflector (e.g., a mirror or a prism). The moveable deflector may undergo small angular perturbations which can cause the first output beam to be deflected over an angular range 167 such that the extremity rays range from directions 164A-1,164A-3 to 165A-1, 165A-2 in one direction of the deflection and from directions 164A-1,164A-3 to 165B-1,165B-2 in an opposing direction of the deflection. During perturbation, the other extremity rays shown in FIG. 5A undergo a similar shift. Thus, the beam may sweep between various positions on the master grating causing the illumination patch 162 to be swept backwards and forwards along the direction 168 parallel to the interference fringes 163. In some embodiments, the coplanar extremity rays 164A-1,164A-3 may be divergent from a point to the left of the drawing. In some cases where the grating to be recorded is smaller than the grating master 161, a beam convergence may be provided.

In various embodiments, either the exposure beams 164A-1,164A-2 and 164B-1,164B-2 or the holographic recording layer 161a can be translated to accomplish line scan exposure such that the illumination patch 163 performs a stepwise or continuous holographic scan exposure along a direction 169. This allows for exposure of large area holographic recording layer 161a by moving the recording beam throughout the holographic recording layer 161a. The direction 169 may be parallel to the direction of the grating K-vector 164 and orthogonal to the extending direction of the interference fringes 163. In some embodiments, the exposure beams 164A-1,164A-2 and 164B-1,164B-2 or the holographic recording layer 161a may be translated in another direction such as a direction parallel to the extending directions of the interference fringes 163.

It should be apparent from consideration of FIGS. 5A-5C and from the above description that by making the angle of intersection of the first output beam and the second output beam from the master grating 161 lie in the xy plane of an xyz cartesian coordinate plane, which is orthogonal to the plane of intersection implied by the above drawings (e.g. the yz plane), the resulting extending directions of the interference fringes 163 and their K-vectors 164 will be orthogonal as illustrated in FIG. 5A.

Figures 6A, 6B:
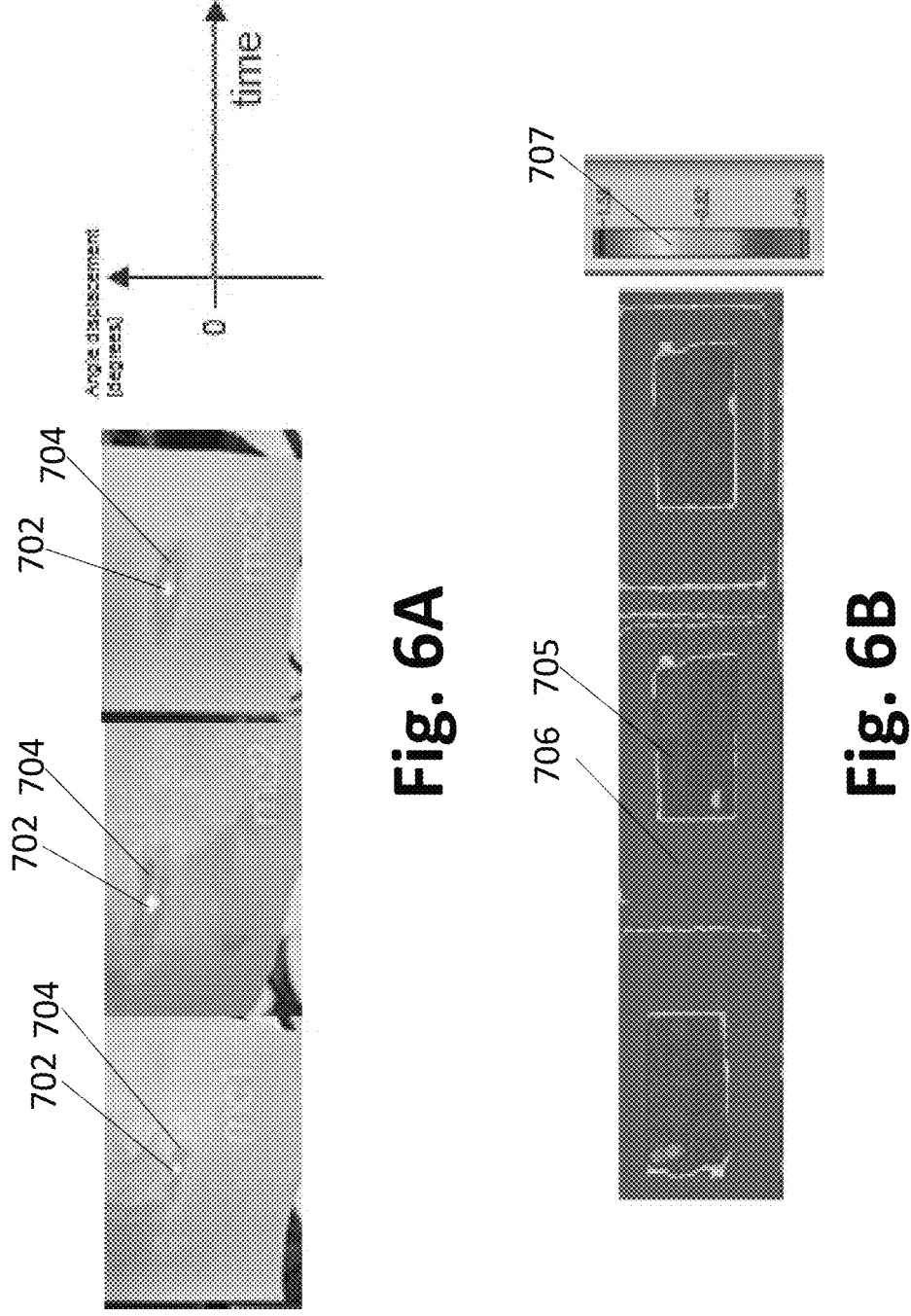
FIG. 6A illustrates a first order pattern generated by illumination of various gratings formed by exposing holographic recording mediums.
FIG. 6B is a transmitted (zero order) haze graphic rendered in false colors of the gratings formed through exposure of holographic recording mediums that create the diffracted beam shown in the images on the left in FIG. 6A.

FIG. 6A illustrates a first order pattern generated by illumination of various gratings formed by exposing holographic recording mediums. The holographic recording mediums were exposed through a direct exposure without movement of the recording beam. The graph on the right shows the angle displacement vs. time during exposure which shows that no angular displacement is performed during exposure. The images on the left each illustrate an intense diffraction region 702 surrounded by an unwanted haze region 704 observed in the diffracted beam. FIG. 6B is a transmitted (zero order) haze graphic rendered in false colors of the gratings formed through exposure of holographic recording mediums that create the diffracted beam shown in the images on the left in FIG. 6A. A color scale 707 shows an extremely high haze region 706 around the active area 705 where the grating is recorded. The diffracted beam shown in the images on the left of FIG. 6A are generated when a beam passes through the active region 705 illustrated in FIG. 6B. In addition, the high haze region 704 of FIG. 6A is present in the diffracted beam when a beam passes through the active area 705. There is also a high haze region 706 surrounding the active area 705 of the grating which may be the result of stray light during exposure of the holographic recording mediums.

Figures 7A, 7B:
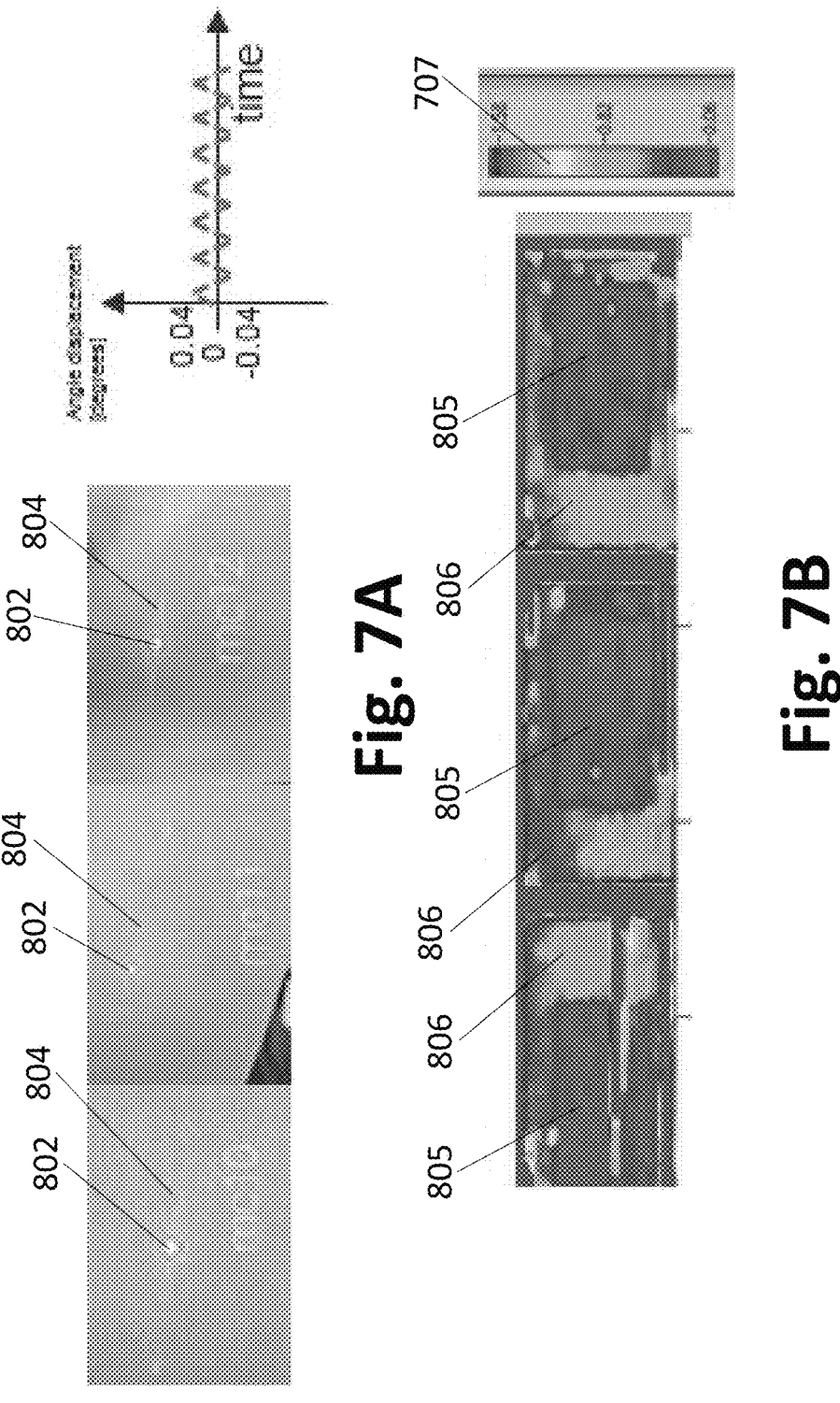
FIG. 7A illustrates a first order pattern generated by illumination of various gratings formed by exposing holographic recording mediums.
FIG. 7B is a transmitted (zero order) haze graphic rendered in false colors of the gratings formed through exposure of holographic recording mediums that create the diffracted beam shown in the images on the left in FIG. 7A.

FIG. 7A illustrates a first order pattern generated by illumination of various gratings formed by exposing holographic recording mediums. The holographic recording mediums were exposed while the recording beam were dithered between +0.04° to −0.04°. The graph on the right shows the angle displacement vs. time during exposure which shows that the light beam is perturbed between 0.04° and −0.04° in a triangular angle displacement waveform. Other movement waveforms have been contemplated (e.g. sinusoidal, non-periodic, . . . ). As illustrated, the unwanted haze portion 804 surrounding the intense exposure region 802 appears to be much smaller than the unwanted haze region 704 present in FIG. 6A where the recording beam was not moved. FIG. 7B is a transmitted (zero order) haze graphic rendered in false colors of the gratings formed through exposure of holographic recording mediums that create the diffracted beam shown in the images on the left in FIG. 7A. A color scale 707 shows reduced haze in the haze region 806 surrounding the active area 805 as compared to the haze area 706 in FIG. 6B where the exposure beam was not moved. Additionally, the haze is reduced in the active area 805 as compared to the active area 705 in FIG. 6B. This demonstrates that haze can be reduced in both the active area 805 and the surrounding haze region 806 by perturbing the beam during exposure. The reduction in haze is observed both in the transmitted beam (zero order light) as demonstrated in FIG. 7B and in the diffracted beam (first order light) as demonstrated in FIG. 7A.

In many embodiments, the recording beam angular displacement vs. time varying waveform may include frequencies and amplitudes tuned to stages in the grating formation process. In such gratings, photoinitiation, the diffusion of monomer and LC, and the times to gelation and phase separation may be carefully optimized and may be sensitive to spatio-temporal gradients or intensity gradients in the material. The disturbance of these processes may result in a general loss of grating contrast and further contributions to scatter. The timescale over which the angular deflection is applied may be more important than the magnitude of the deflection, at least for small deflection angles. In some embodiments, the disturbance of the grating formation processes may not necessarily be a disadvantage and may offer advantages in terms of controlling monomer and LC diffusion polymerization and phase separation.

Figure 8:
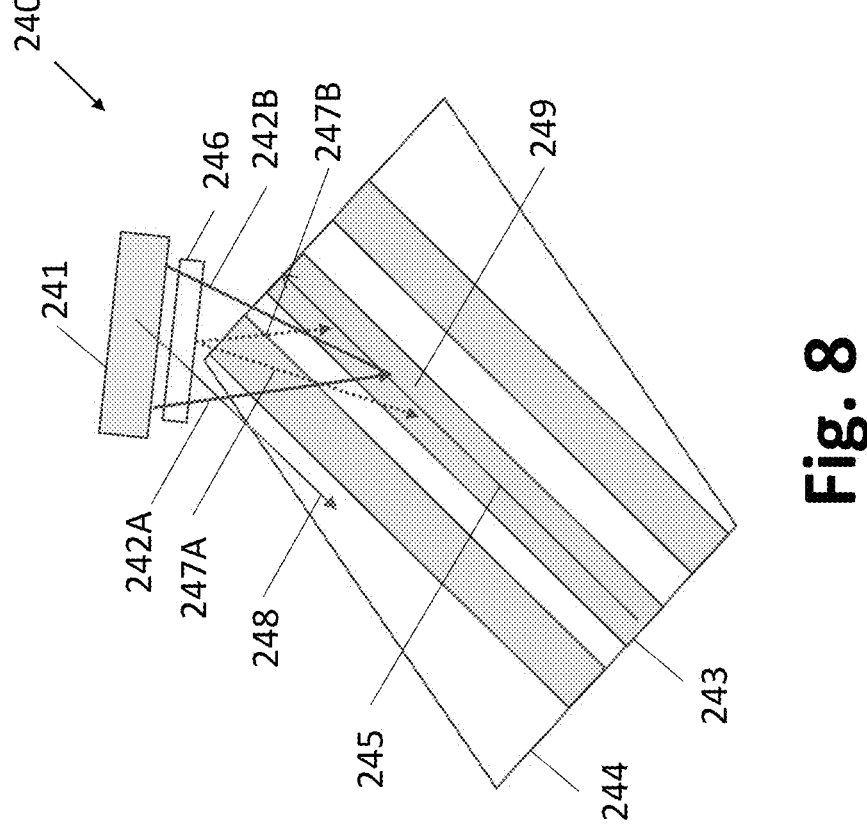
FIG. 8 schematically illustrates a holographic line scan exposure system in accordance with an embodiment of the invention.

In many embodiments, a holographic line scan exposure system may be configured without performing beam deflection along the extending direction of the holographic interference pattern. FIG. 8 schematically illustrates a holographic line scan exposure system 240 in accordance with an embodiment of the invention. The holographic line scan exposure system 240 includes a moveable light source 241 configured to produce at least two intersecting light beams 242A,242B. The intersecting light beams 242A,242B may form a holographic interference pattern 243 in a holographic recording medium 244 supported by a substrate. The holographic interference pattern 243 extends in the extending direction 245. An optical element 246 may be positioned between the moveable light source 240 and the holographic recording medium 244. The optical element 246 may provide a ray divergence (or convergence) of the exposure beam as represented by the dotted ray lines 247A,247B. The ray divergence (or convergence) takes place within a plane that contains the extending direction 245 and is substantially orthogonal to the holographic recording medium surface. Hence, the intersecting light beams 242A,242B lie in a plane orthogonal to the plane containing the divergent rays 247A, 247B. In many embodiments, while divergent rays 247A, 247B are shown, the optical element 246 may provide with convergent rays. In many embodiments, the optical element 246 includes at least one cylindrical surface of positive or negative optical power according to the beam configuration. In many embodiments, the optical element 246 includes at least one freeform surface. In some embodiments, the intersecting light beams 242A,242B produced by the movable light source 240 lie in a plane substantially orthogonal to the plane formed by the beam convergence or divergence 247A, 247B by the optical element 246.

In some embodiments, the moveable light source 240 and/or the holographic recording medium 244 are configured to translate in a plane parallel to the holographic interference pattern 243 while maintaining stationary exposure angles such that the holographic interference pattern 243 remains stationary. The moveable light source 240 and/or the holographic recording medium 244 may translate in a translation direction 248. The translation direction 248 may be parallel to the interference fringe pattern extending direction 245 which is defined by the intersection region 249 of the recording beams 242A,242B.

In some embodiments, the combination of the exposure beam divergence or convergence by the optical element 246 and the translation of the movable light source 240 and/or the holographic recording medium 244 is such that spatio-temporal displacement and cancellation of unwanted intensity nonuniformities occurs.

In many embodiments, the substrate on which the holographic recording medium 244 is applied may include a transparent optical material.

In many embodiments, the holographic recording medium 244 may be applied to a curved substrate. In many embodiments, the holographic interference pattern 243 may include fringes curved in at least one dimension with the extending direction 245 lying along a tangent to a portion of a fringe.

As noted earlier, it has been demonstrated that angular deflections substantially clocked along the exposure fringes with offset angle magnitudes as high as 2 degrees relative to the extending direction show no significant impact on the grating fringes (e.g. grating diffractions and the diffraction efficiency of the grating). In the embodiment illustrated in FIG. 8, deviations from orthogonality between the plane containing the intersecting light beam directions produced by the movable light source and the plane within which ray convergence or divergence by the optical element takes place may not have a significant impact on diffraction efficiency of the grating for deviation from orthogonality not greater than 2 degrees. In some embodiments, deviations from orthogonality between the plane within which beam convergence or divergence 247A,247B by the optical element 246 takes place and the surface of the holographic recording medium 244 may not have a significant impact on diffraction efficiency of the grating for deviation from orthogonality not greater than 2 degrees.

FIG. 9 is a method 900 for reducing haze during the recording of a hologram in accordance with an embodiment of the invention. The method 900 includes providing (902) a holographic recording medium. The holographic recording medium may include a PDLC mixture or other type of holographic mixture which responds to the exposure of light. The method further includes exposing (904) the holographic recording medium using at least two intersecting light beams for forming a holographic interference pattern. The holographic interference pattern may include a holographic fringe pattern which includes a fringe vector which makes up the extending direction of the holographic fringe pattern. The two intersecting light beams may be provided through one or more laser sources which diffract through a grating pattern. The grating pattern may have an extending direction parallel to the fringe vector. In some embodiments, the light from the one or more laser sources may be deflected before entering the grating pattern.

The method further includes moving (906) the at least two intersecting light beams in a direction that leaves the holographic interference pattern stationary and results in a spatio-temporal displacement and cancellation of unwanted intensity non-uniformities. The direction which the two intersecting light beams are moved may be parallel to the fringe vector or the extending direction of the holographic fringe patterns. In some embodiments, the moving (906) may include dithering or wiggling the at least two light beams in this direction.

FIG. 10 is a method 1000 for reducing haze during the recording of a hologram in accordance with an embodiment of the invention. The method 1000 includes providing (1002) a holographic recording medium. The holographic recording medium may include a PDLC mixture or other type of holographic mixture which responds to the exposure of light. The method 100 further includes providing (1004) a master hologram containing a grating. The grating includes an extending direction which may be the extending direction of the slits within the grating. The method 100 further includes providing (1006) a light source and a moveable deflector configured to inject light into the master hologram. The light source may include one or more laser light sources and the moveable deflector may be a moveable mirror, prism, or lens. The method 100 further includes exposing (1008) the holographic recording medium through the master hologram such that the grating in the master hologram creates two or more beams which create a holographic interference pattern in the holographic recording medium. The two or more beams may be a zero order beam of one beam and a first order diffraction beam of another beam. The two or more beams may interfere in the holographic recording medium to form the holographic interference pattern. The holographic interference pattern includes a holographic fringe pattern which includes a fringe vector which makes up the extending direction of the holographic fringe pattern. The fringe vector may be parallel to the extending direction of the grating.

The method 100 further includes, while exposing the holographic recording medium, moving (1010) the deflector such that the light moves in a direction parallel to the extending direction of the grating. Advantageously, moving the light along a direction parallel to the extending direction of the grating leaves the holographic interference pattern (the recording angles of the two or more beams of light) stationary while creating a spatio-temporal displacement and cancellation of unwanted intensity non-uniformities. These intensity non-uniformities may be cause by defects within the components of the exposure system such as the deflector or the holographic master. Advantageously, cancellation of the intensity non-uniformities decreases haze.

Example Improvements

Various embodiments of the invention relate to the recording of isotropic photopolymer holograms and non-isotropic holograms formed by phase separation in a liquid crystal monomer mixture. Since these two material systems may have very different grating formation kinetics it may be difficult to have an exposure method that works for both cases. Various embodiments of the invention relate to a low haze exposure process and exposure apparatus which is relevant to holographic recording in various holographic recording mediums include but not limited to nanoparticles and monomers. This low haze exposure process and exposure apparatus may be applied to any holographic recording medium. In some embodiments, the exposure process and exposure apparatus can also provide a reduction in haze from regions of a holographic recording material in which no grating has been formed. The apparatus and method can reduce haze contributed by both grating and non-grating regions. A further advantage of embodiments of the invention is a greater degree of robustness against haze sources occurring in the recording path.

The haze reduction process and exposure apparatus may achieve significant reductions in haze with minimal loss of diffraction efficiency (DE) (e.g. <10% loss). In some embodiments, a haze reduction in the range of 50-75% with a minimal DE drop in the range 1-5% can be achieved by applying an angular beam perturbation characterized by: an angular deflection in the range 0°-1° and a directional change frequency of 0.015 Hz. The angular beam perturbation is applied in a direction parallel to the gratings lines of the holographic master.

It is advantageous to eliminate haze contributions from various components of the exposure apparatus such as deflectors, the holographic master, and holographic recording layer, and haze contributions from collimation errors. And indeed, the haze reduction process and exposure apparatus may prevent haze contributions from various components of the exposure apparatus and collimation errors which may make the exposure apparatus insensitive to these haze contributions.

In many embodiments, the holographic exposure technique include a two beam holographic exposure apparatus (as illustrated in FIG. 1) providing an object beam and a reference beam. In these embodiments, the holographic exposure technique may not include a holographic master.

Embodiments of the invention are not strictly limited to the elimination of haze. For example, unwanted reflections can be averaged out if they originate from a discrete point in space. In fact, even reflections coming from a surface after the copy plane can be averaged out as long as there is sufficient wedge between the copy plane and that surface. Thus, perturbing the holographic recording beam may be relevant to elimination of unwanted reflections. Some embodiments of the invention may be used to provide at least partial suppression of fixed pattern or statistical illumination nonuniformity resulting from the coherence of laser sources in the exposure apparatus.

Embodiments of the invention allow for holographic haze arising in the exposure system to be measured and characterized independently of the material haze.

Embodiments Related to Non-Linear Gratings

Embodiments of the invention also relate to haze reduction in non-linear gratings. Haze reduction may be achieved by aligning the perturbation angle of the displace illumination along the extending direction of the gratings.

Figure 11:
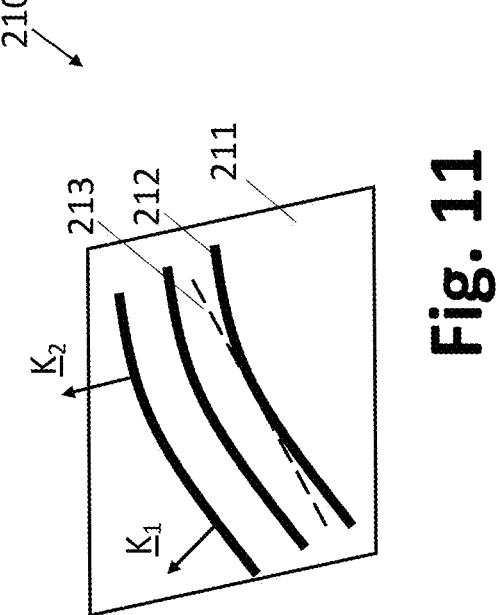
FIG. 11 conceptually illustrates a perspective view of a holographic recording configuration in accordance with an embodiment of the invention.

In some embodiments, the fringe patterns may be curved, for example in holograms designed to have optical power. FIG. 11 conceptually illustrates a perspective view of a holographic recording configuration 210 including a planar substrate 211 supporting a grating with curved fringes 212 in accordance with an embodiment of the invention. A linear perturbation direction 213 is superimposed which shows the direction in which one or more beams of light are moved. In a linear perturbation, the condition for close alignment of the perturbation direction and the fringe direction cannot be met at all points along the fringe. The clocking direction and fringe direction may correctly align near the center of the curved fringes 212, but a mismatch between the extending direction of the curved fringes 212 and the linear perturbation direction 213 occurs elsewhere may result in a loss of diffraction efficiency at the extremities of the curved fringes 212.

Figure 12:
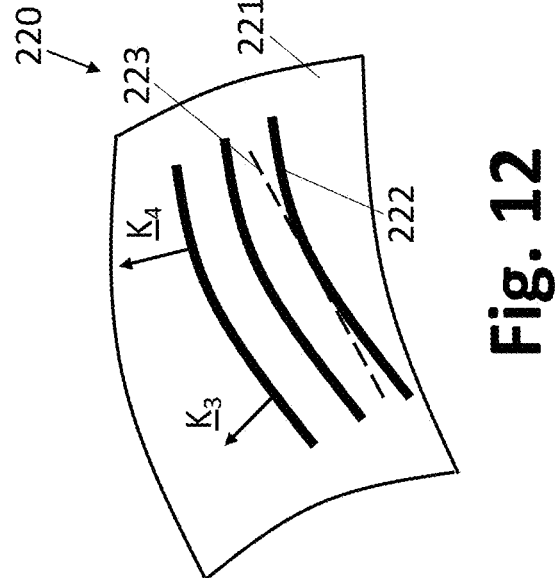
FIG. 12 conceptually illustrates a perspective view of a holographic recording configuration in accordance with an embodiment of the invention.

In some applications, the curved holographic fringes may be formed on a substrate which is curved in at least one of two orthogonal directions. Such configurations can occur in automotive windshield embedded waveguide-based displays or eyeglass waveguide-based displays. FIG. 12 conceptually illustrates a perspective view of a holographic recording configuration 220 including a curved substrate 221 supporting a grating with curved fringes 223 with a linear perturbation direction 223 superimposed. In such embodiment, the curved fringes 223 may be curvilinear in a three-dimensional space. As illustrated, there may be a mismatch between the linear perturbation direction 223 and the extending direction of the curved fringes 223.

Figure 13:
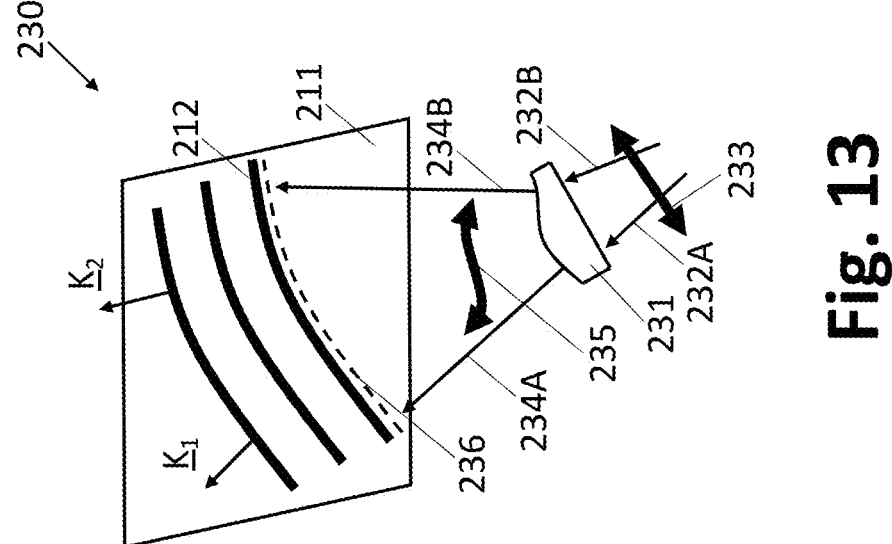
FIG. 13 conceptually illustrates a holographic recording system in accordance with an embodiment of the invention.

In embodiments where there are curved fringes, matching of perturbation direction with the extending direction of the grating fringes may benefit from predistortion of the beam displacement trajectory. FIG. 13 conceptually illustrates a holographic recording system 230 based on the one illustrated in FIG. 11 in which a moveable deflector 231 having at least one freeform wavefront modifying surface is used to convert an exposure beam 232A,232B with the moveable beam deflector 231 perturbated along a linear direction 233 into a modified exposure beam 234A,234B with beam displacements 235 having continuously spatially-varying perturbation direction direction 236 aligned along a curved grating fringe 212. Note that, in many embodiments, each fringe will have a unique curvature and that the moveable deflector 231 is configured to deflect the beam in such a manner as to follow the unique curvature while being perturbed in the linear direction 233.

In many embodiments the moveable deflector 231 may be a lens having at least one freeform wavefront modifying surface. In some embodiments, the deflector 231 can be a curved mirror with a freeform wavefront modifying surface. Freeform optical surfaces may be surfaces having no translational or rotational symmetry about axes normal to the mean plane of the surface. In contrast, spherical or aspheric surfaces can be defined as surface of rotation around an optical axis. However, anamorphic surfaces, which combine spherical/aspherical and toroidal forms and therefore have translational symmetry, can also be included in the category of freeform optical surfaces. Freeform optical surfaces may enable more sophisticated wavefront optimization in off-axis wide angle optical designs. Freeform optical surfaces may not be manufactured using conventional two-degree-of-freedom manufacturing processing. Instead, the freeform optical surfaces may be manufactured using multi-degree-of-freedom processes, such as but not limited to multi-degree-of-freedom diamond cutting processes.

In some embodiments, a reflective or transmissive diffractive structure can provide a freeform wavefront modifying surface.

In various embodiments, the freeform optical surface can be provided by a reconfigurable or adaptive reflective or transmissive optical element. In many such embodiments, the reconfigurable optical element can be reflective. In some embodiments, the reconfigurable optical element can be based on an optical array technology. Examples of reconfigurable optical elements may be found throughout US Pat. Pub. No. 2019/0339558 entitled "Methods and Apparatuses for Copying a Diversity of Hologram Prescriptions from a Common Master", which is herein incorporated by reference in its entirety for all purposes.

In some embodiments, the holographic recording system can further comprise a dynamically reconfigurable freeform surface having a prescription computed using wavefront data measured by a wavefront sensor included in the holographic recording system. In some embodiments, the dynamic reconfigurable optical element can be an acoustic optical phase modulator.

Any of the previously disclosed methods (FIG. 9 or 10) for reducing haze during the recording can incorporate a wavefront reconfigurable element to provide beam deflections with continuously varying perturbation angles aligned along a curvilinear grating fringe.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A waveguide recording system comprising:
a polymer dispersed liquid crystal mixture; and
a moveable light source configured to produce at least two intersecting light beams for forming liquid crystal-rich and liquid crystal-poor regions in the polymer dispersed liquid crystal mixture;
wherein the liquid crystal-rich regions and the liquid crystal-poor regions form a grating structure;
wherein the movable light source is configured to move the two intersecting light beams in a direction such that the grating structure remains stationary while providing spatio-temporal displacement and cancellation of unwanted intensity.

2. The waveguide recording system of claim 1, wherein the moveable light source comprises a stationary laser with a moveable deflector.

3. The waveguide recording system of claim 2, wherein the moveable deflector comprises a mirror or a lens.

4. The waveguide recording system of claim 2, wherein the movable deflector is configured to tune a grating formation process by varying at least one movable deflection characteristic selected from the group consisting of speed, acceleration, direction, and amplitude.

5. The waveguide recording system of claim 1, wherein the moveable light source is configured to translate in a plane parallel to the grating structure while maintaining stationary exposure angles to perform a line-scan exposure.

6. The waveguide recording system of claim 1, wherein the polymer dispersed liquid crystal mixture is applied to a transparent substrate.

7. The waveguide recording system of claim 6, wherein the transparent substrate is curved.

* * * * *